(12) United States Patent
Maruyama

(10) Patent No.: US 11,743,401 B2
(45) Date of Patent: Aug. 29, 2023

(54) IMAGE FORMING APPARATUS AND METHOD FOR CONTROLLING THE SAME FOR DISPLAYING AN OBJECT

(71) Applicant: CANON KABUSHIKI KAISHA, Tokyo (JP)

(72) Inventor: Naoki Maruyama, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/582,743

(22) Filed: Jan. 24, 2022

(65) Prior Publication Data
US 2022/0247879 A1 Aug. 4, 2022

(30) Foreign Application Priority Data
Jan. 29, 2021 (JP) ................................ 2021-012779

(51) Int. Cl.
*H04N 1/00* (2006.01)
(52) U.S. Cl.
CPC ..... *H04N 1/00411* (2013.01); *H04N 1/00413* (2013.01); *H04N 1/00474* (2013.01)
(58) Field of Classification Search
CPC ....... H04N 2201/0094; H04N 1/00411; H04N 1/00474; H04N 1/00482; H04N 1/00413; H04N 1/00424; H04N 1/00408; H04N 1/4433; H04N 1/0044; H04N 1/00517; H04N 1/4406; H04N 1/00456; H04N 1/00161; H04N 1/00464; H04N 1/00477; H04N 1/00416; H04N 1/4426; H04N 1/00395; H04N 1/0035; H04N 1/00204; H04N 1/00432; H04N 1/00222; H04N 1/00938; H04N 2201/0075; H04N 1/00472; H04N 1/00209; H04N 1/32058; H04N 2201/0084; H04N 1/00225; H04N 1/00347; H04N 1/00689; H04N 1/00925; H04N 1/00663; H04N 1/04; H04N 2201/3276;
(Continued)

(56) References Cited

U.S. PATENT DOCUMENTS

2014/0096086 A1* 4/2014 Cho .................. H04N 1/00474
715/847
2017/0185248 A1* 6/2017 Lee ....................... G06F 3/0486
(Continued)

FOREIGN PATENT DOCUMENTS

JP 2016071680 A 5/2016

*Primary Examiner* — Henok Shiferaw
(74) *Attorney, Agent, or Firm* — Canon U.S.A., Inc. IP Division

(57) ABSTRACT

An image forming apparatus having a first function of performing first processing based on image data obtained by reading a document, and a second function of performing second processing based on image data obtained by reading a document includes a controller including a processor that displays, on the display unit, a first setting screen for setting a setting value to be used for a job of the first function, displays, on a display unit, an object for accepting a user operation for displaying a second setting screen for setting a setting value to be used for a job of the second function together with at least a part of the first setting screen upon satisfaction of a predetermined condition in a state where the first setting screen is displayed and no user operation is accepted, and displays the second setting screen on the display unit upon selection of the object.

13 Claims, 24 Drawing Sheets

(58) Field of Classification Search
CPC ........... H04N 1/00599; H04N 1/00726; H04N 2201/3273; H04N 1/00448; H04N 1/00458; H04N 1/00949; H04N 1/32507; H04N 1/3263; H04N 1/3876; H04N 2201/0089; H04N 2201/0093; H04N 1/00496; H04N 1/0084
See application file for complete search history.

(56) References Cited

U.S. PATENT DOCUMENTS

| | | | |
|---|---|---|---|
| 2017/0285909 A1* | 10/2017 | Ono | H04L 67/10 |
| 2019/0132460 A1* | 5/2019 | Sawano | H04N 1/00424 |
| 2019/0132476 A1* | 5/2019 | Sawano | H04M 3/5183 |
| 2020/0028982 A1* | 1/2020 | Tose | H04N 1/00435 |
| 2020/0137244 A1* | 4/2020 | Kubota | H04N 1/00514 |
| 2021/0250453 A1* | 8/2021 | Toda | H04N 1/00482 |
| 2021/0352186 A1* | 11/2021 | Nishiyama | H04N 1/00482 |

* cited by examiner

FIG.4

| ↩ OTHER SETTINGS | | |
|---|---|---|
| DENSITY | : ±0 | › |
| TWO-PAGE SPREAD | : OFF | › |
| TWO-SIDED | : OFF | › |
| PAGE AGGREGATION | : OFF | › |
| DOCUMENT TYPE | : TEXT/PHOTO/MAP (PRIORITY TO SPEED) | › |
| MIXED DOCUMENT SIZE | : OFF | › |

FIG.7
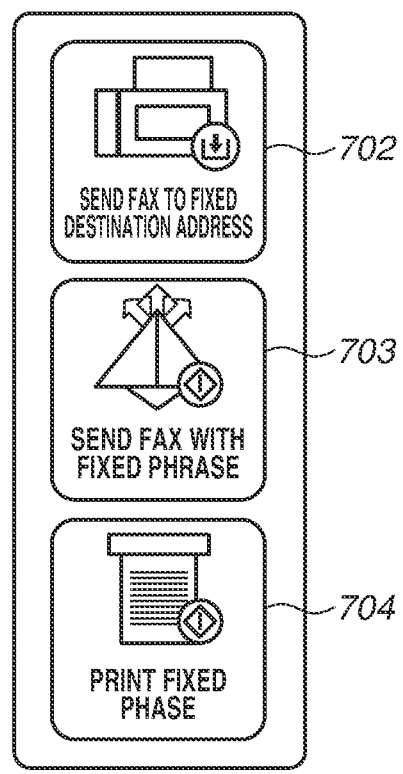
EXAMPLE OF LAUNCHER AREA
VERTICAL DISPLAY (700)
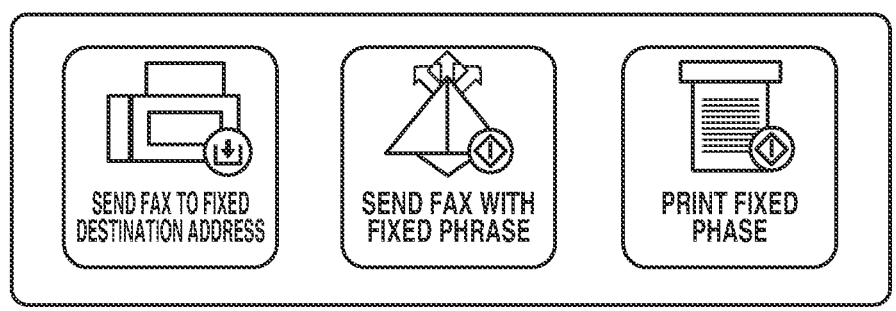
EXAMPLE OF LAUNCHER AREA HORIZONTAL DISPLAY (701)

FIG.8

DISPLAY PERMISSION SCREEN TABLE 800

| SCREEN ID | PERMISSION LEVEL LOWER LIMIT | DISPLAY ORIENTATION |
|---|---|---|
| 801 — DISP_HOME | HIER_FIRST | DIR_RIGHT |
| 802 — DISP_COPY | HIER_FIRST | DIR_LEFT |
| 803 — DISP_STATUS | HIER_FIRST | DIR_TOP |
| 804 — DISP_FAX | HIER_FIRST | DIR_LEFT |

FIG.9
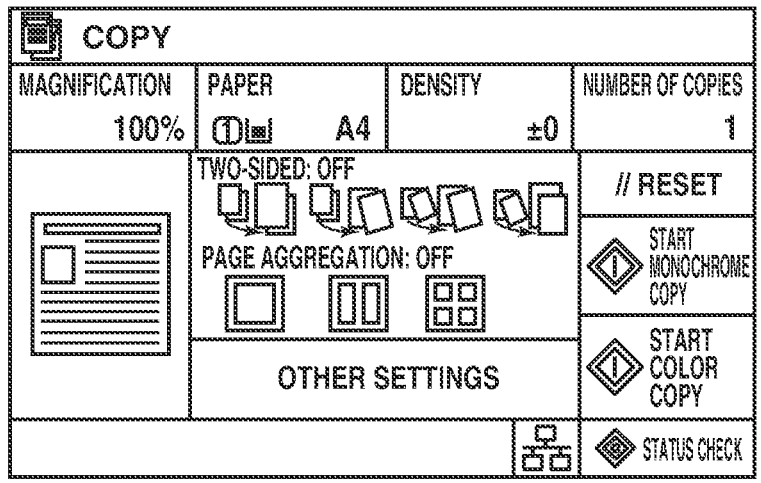
0% DISPLAY RATIO OF LAUNCHER AREA VERTICAL DISPLAY (900)
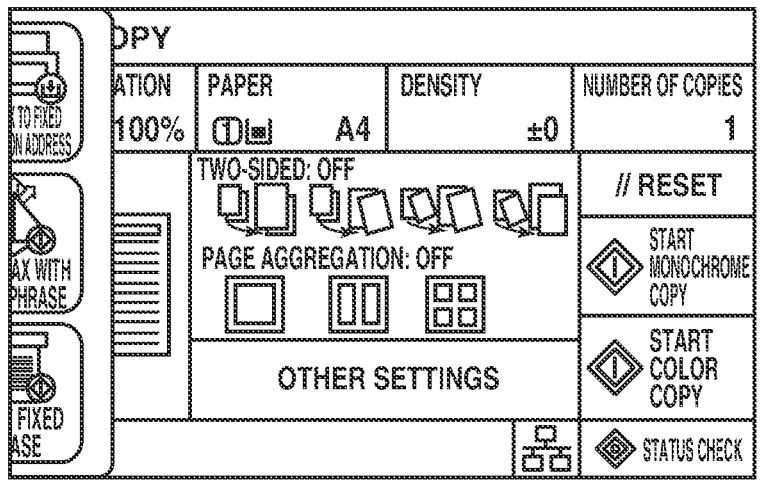
50% DISPLAY RATIO OF LAUNCHER AREA VERTICAL DISPLAY (901)
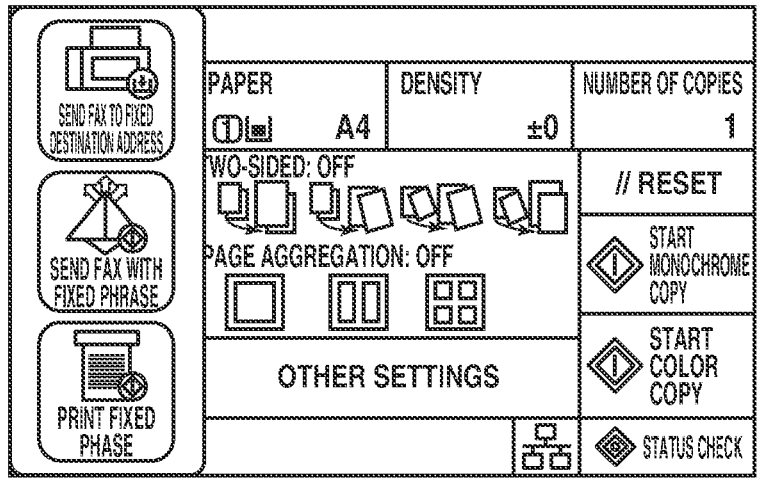
100% DISPLAY RATIO OF LAUNCHER AREA VERTICAL DISPLAY (902)

FIG.10
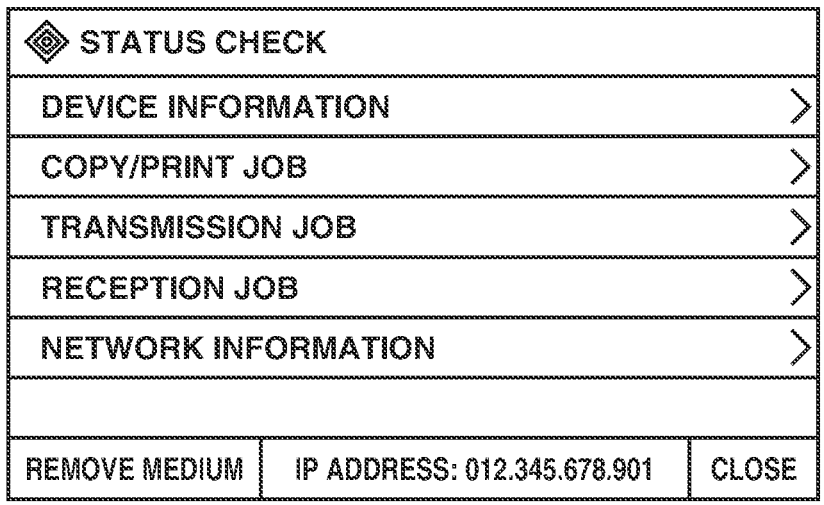
0% DISPLAY RATIO OF LAUNCHER AREA HORIZONTAL DISPLAY (1000)
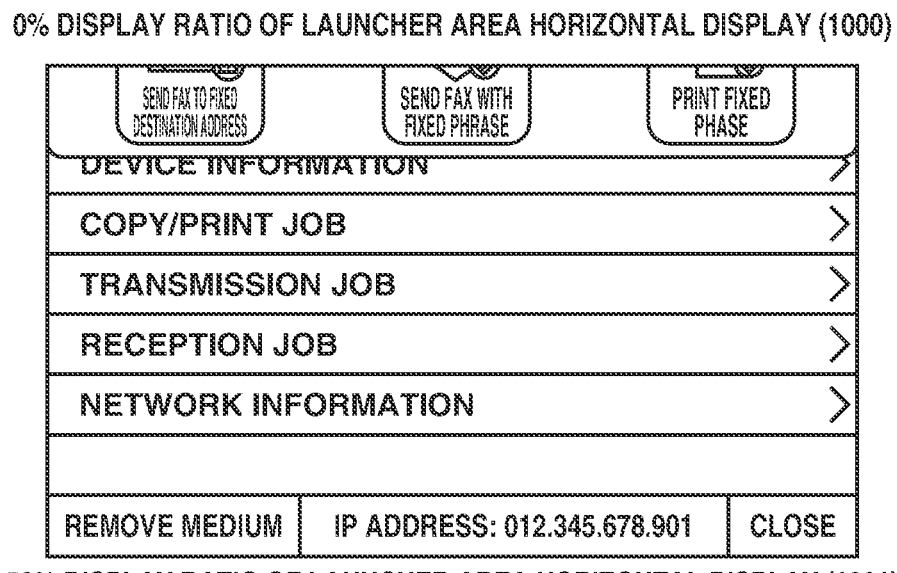
50% DISPLAY RATIO OF LAUNCHER AREA HORIZONTAL DISPLAY (1001)
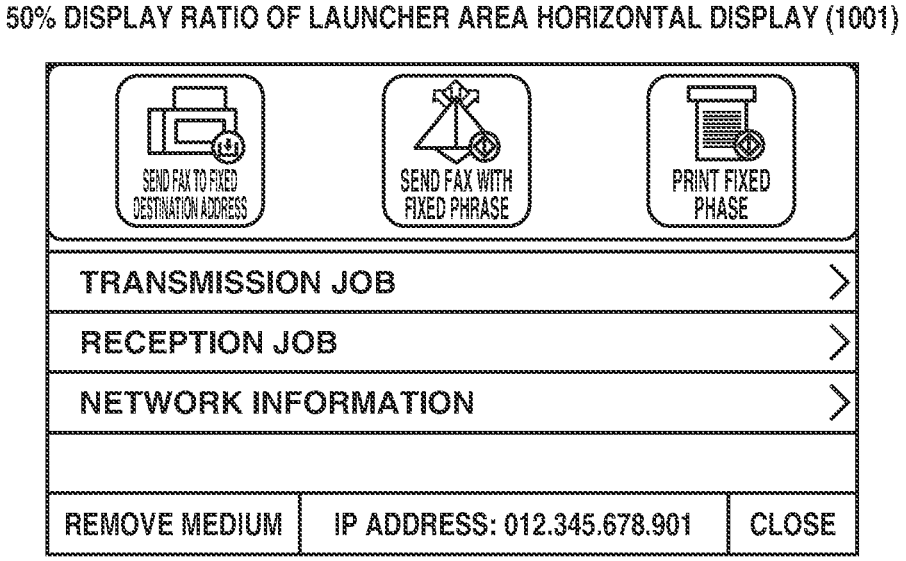
100% DISPLAY RATIO OF LAUNCHER AREA HORIZONTAL DISPLAY (1002)

DISPLAY SPEED TABLE 1200

| DISPLAY SPEED Ls | DISPLAY COMPLETION TIME Et |
|---|---|
| 1201 — Fast | 2 Sec |
| 1202 — Normal | 5 Sec |
| 1203 — Slow | 10 Sec |

FIG.15

LAUNCHER AREA VERTICAL DISPLAY ICON TABLE 1500

| ICON SCREEN ID | ICON AREA START COORDINATES Irls | | ICON AREA END COORDINATES Irle | |
|---|---|---|---|---|
| | X COORDINATES | Y COORDINATES | X COORDINATES | Y COORDINATES |
| 1501 DISP_FIX_FAX | DEF_LM | DEF_TM | DEF_LM+ DEF_ICON_WID | DEF_TM+ DEF_ICON_HEI |
| 1502 DISP_FIX_ PHRASE_SEND | DEF_LM | DEF_TM+ DEF_V_INTVL+ DEF_ICON_HEI | DEF_LM+ DEF_ICON_WID | DEF_TM+ DEF_V_INTVL+ DEF_ICON_HEI*2 |
| 1503 DISP_FIX_ PHRASE_PRINT | DEF_LM | DEF_TM+ DEF_V_INTVL*2+ DEF_ICON_HEI*2 | DEF_LM+ DEF_ICON_WID | DEF_TM+ DEF_V_INTVL*2+ DEF_ICON_HEI*3 |

LAUNCHER AREA HORIZONTAL DISPLAY ICON TABLE 1504

| ICON SCREEN ID | ICON AREA START COORDINATES Itbs | | ICON AREA END COORDINATES Itbe | |
|---|---|---|---|---|
| | X COORDINATES | Y COORDINATES | X COORDINATES | Y COORDINATES |
| 1505 DISP_FIX_FAX | DEF_LM | DEF_TM | DEF_LM+ DEF_ICON_WID | DEF_TM+ DEF_ICON_HEI |
| 1506 DISP_FIX_ PHRASE_SEND | DEF_LM+ DEF_H_INTVL+ DEF_ICON_WID | DEF_TM | DEF_LM+ DEF_H_INTVL+ DEF_ICON_WID*2 | DEF_TM+ DEF_ICON_HEI |
| 1507 DISP_FIX_ PHRASE_PRINT | DEF_LM+ DEF_H_INTVL*2+ DEF_ICON_WID*2 | DEF_TM | DEF_LM+ DEF_H_INTVL*2+ DEF_ICON_WID*3 | DEF_TM+ DEF_ICON_HEI |

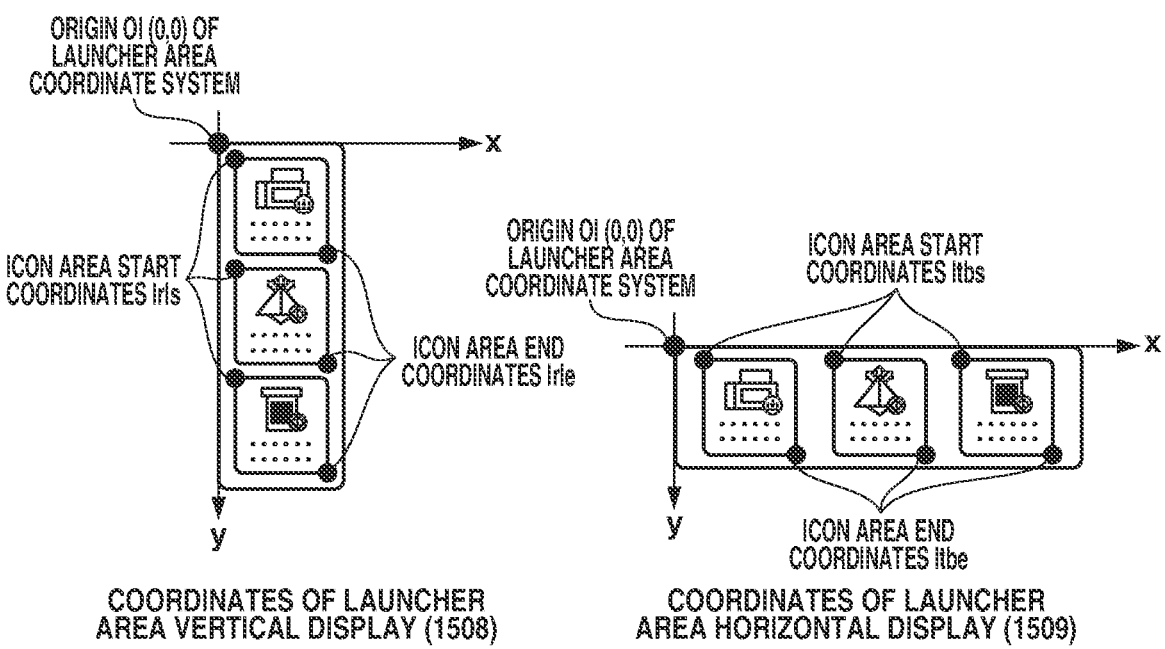

COORDINATES OF LAUNCHER AREA VERTICAL DISPLAY (1508)

COORDINATES OF LAUNCHER AREA HORIZONTAL DISPLAY (1509)

IMAGE FORMING APPARATUS AND METHOD FOR CONTROLLING THE SAME FOR DISPLAYING AN OBJECT

BACKGROUND

Field of the Disclosure

The present disclosure relates to an image forming apparatus and a method for controlling the image forming apparatus.

Description of the Related Art

In recent years, printers, copying machines, smartphones, and other various apparatuses have been provided with advanced functions. A plurality of functions and a plurality of applications can be executed by any one of these apparatuses. Such an apparatus is known to display a plurality of functions and a plurality of applications as icons and display a home screen that accepts a selection of a function or application to be used from the user.

Accordingly, with the increase in the number of icons for functions that can be executed, the user's labor for searching for the icon of a target function that the user desires also increases. For this reason, many apparatuses are provided with a shortcut display function for displaying icons for frequently used functions and settings in list form to make it easier to perform any of the functions and settings.

For example, a shortcut display button is provided for, by being pressed, displaying frequently used functions and job settings as icons in list form, and the list of the icons can be changed by using a tab key. There are some apparatuses that display various functions and job settings in such a manner that the user can select a desired function or setting with a small number of operations (see Japanese Patent Application Laid-Open No. 2016-71680).

Commonly, the user performs an operation to display the home screen where icons and shortcut keys for activating applications are arranged, and selects a desired icon or shortcut key from the home screen. However, if the home screen is not displayed, or if the home screen is displayed but a screen different from the screen on which a desired icon is arranged is displayed, the user needs to issue an instruction to make a screen transition to display the desired icon.

SUMMARY

Embodiments of the present disclosure are directed to, even during display of a screen different from a screen on which an icon or shortcut key for activating a certain application is displayed, displaying the icon or shortcut key without increasing the number of user operations.

According to embodiments of the present disclosure, an image forming apparatus having a first function of performing first processing based on image data obtained by reading a document, and a second function of performing second processing based on image data obtained by reading a document includes a display unit configured to display a screen, and a controller including a processor, wherein the controller is configured to display, on the display unit, a first setting screen for setting a setting value to be used for a job of the first function, display, on the display unit, an object for accepting a user operation for displaying a second setting screen for setting a setting value to be used for a job of the second function together with at least a part of the first setting screen upon satisfaction of a predetermined condition in a state where the first setting screen is displayed and no user operation is accepted, and display the second setting screen on the display unit upon selection of the object.

Further features of the present disclosure will become apparent from the following description of exemplary embodiments with reference to the attached drawings.

BRIEF DESCRIPTION OF THE DRAWINGS

FIG. 4 illustrates an example of a detail setting screen for the application displayed on the operation unit according to the exemplary embodiment.

FIG. 7 illustrates examples of a launcher area displayed on the operation unit according to the exemplary embodiment.

FIG. 8 illustrates an example of a table related to launcher area display permission according to the exemplary embodiment.

FIG. 9 illustrates examples of vertically elongated launcher area display according to the exemplary embodiment.

FIG. 10 illustrates examples of horizontally elongated launcher area display according to the exemplary embodiment.

FIG. 11 illustrates an example of a screen displayed when an icon in the launcher area is selected according to exemplary embodiment.

FIG. 12 illustrates an example of a table representing the relation between a display speed and display completion time of the launcher area display according to the exemplary embodiment.

FIG. 15 are tables and schematic views illustrating the relation between start and end coordinates of the icon display inside the launcher area and the launcher area according to the exemplary embodiment.

DESCRIPTION OF THE EMBODIMENTS

Exemplary embodiments of the present disclosure will be described below with reference to the accompanying drawings.

A first exemplary embodiment will be described below. A case where a multifunction peripheral 100 is an example of an information processing apparatus will be described below. The information processing apparatus according to the present exemplary embodiment is not limited to a multifunction peripheral but applicable to a single function peripheral (SFP), personal computer (PC), tablet terminal, and smartphone.

Figure 1:
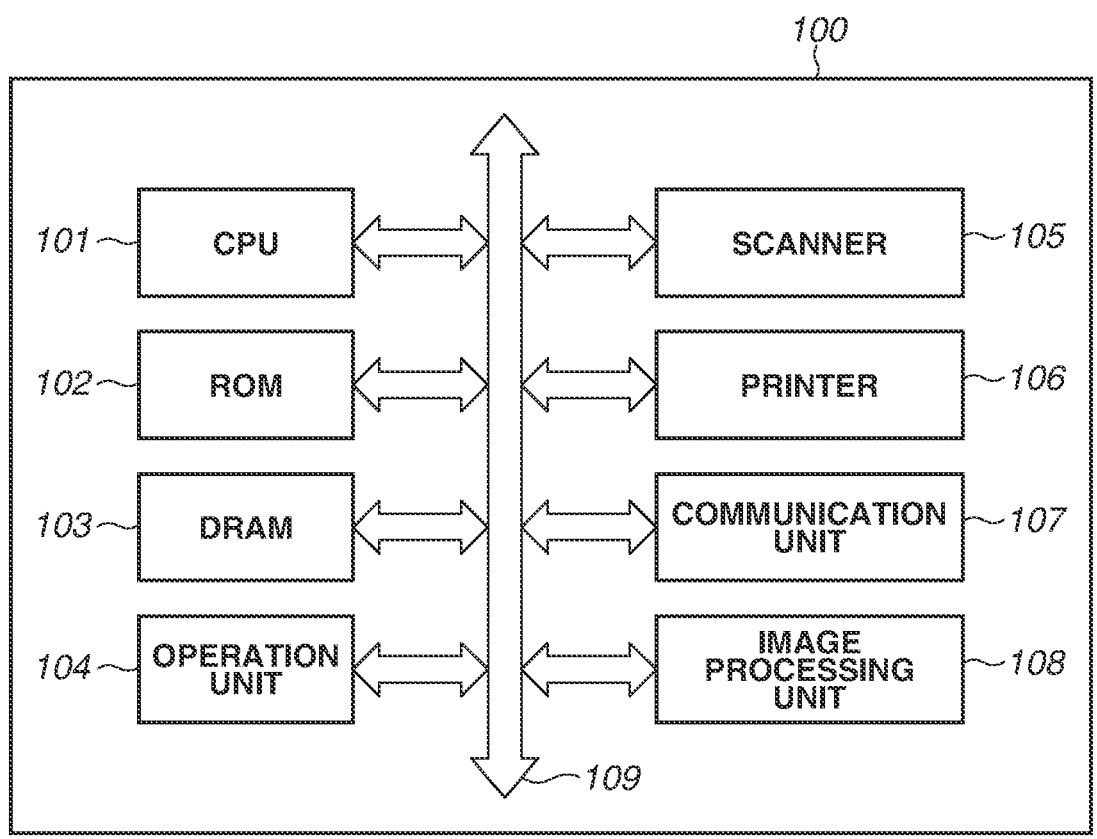
FIG. 1 illustrates an example of a hardware configuration of an information processing apparatus according to an exemplary embodiment.

FIG. 1 illustrates an example of a hardware configuration of the multifunction peripheral 100. A central processing unit (CPU) 101 serves as a system control unit and controls the entire system. The CPU 101 reads a control program stored in a read only memory (ROM) 102 and executes the program. The ROM 102 includes a flash memory such as an embedded Multi Media Card (eMMC) for storing the control program for the CPU 101. The ROM 102 also stores setting values and image data that need to be retained when power is turned OFF. A dynamic random access memory (DRAM) 103 stores program control variables. The DRAM 103 is a volatile memory for temporarily storing image data to be processed. An operation unit 104 is an interface unit that, displays information about the inside of the apparatus to the user. The operation unit 104 includes a display that displays a screen and a touch panel that accepts a touch operation from the user. The operation unit 104 may include one or a plurality of physical buttons in addition to the above-described components. A scanner 105 reads a document and converts the image into binary data to generate image data. The multifunction peripheral 100 reads a document for the image transmission function by using the scanner 105. A printer 106 performs fixing temperature adjustment control to fix the image generated based on the image data onto a recording sheet and outputs the recording sheet. A communication unit 107 is an interface unit for interfacing with an external communication network, includes a network communication unit serving as an interface with a network. An image processing unit 108 includes an Application Specific Integrated Circuit (ASIC) for performing resolution conversion, compression and decompression, rotation, and other image processing on the image data input via the scanner 105 or the communication unit 107 and the image data to be output by the printer 106 or the communication unit 107 to. The above-described units are connected with each other via a data bus 109.

Figure 2:
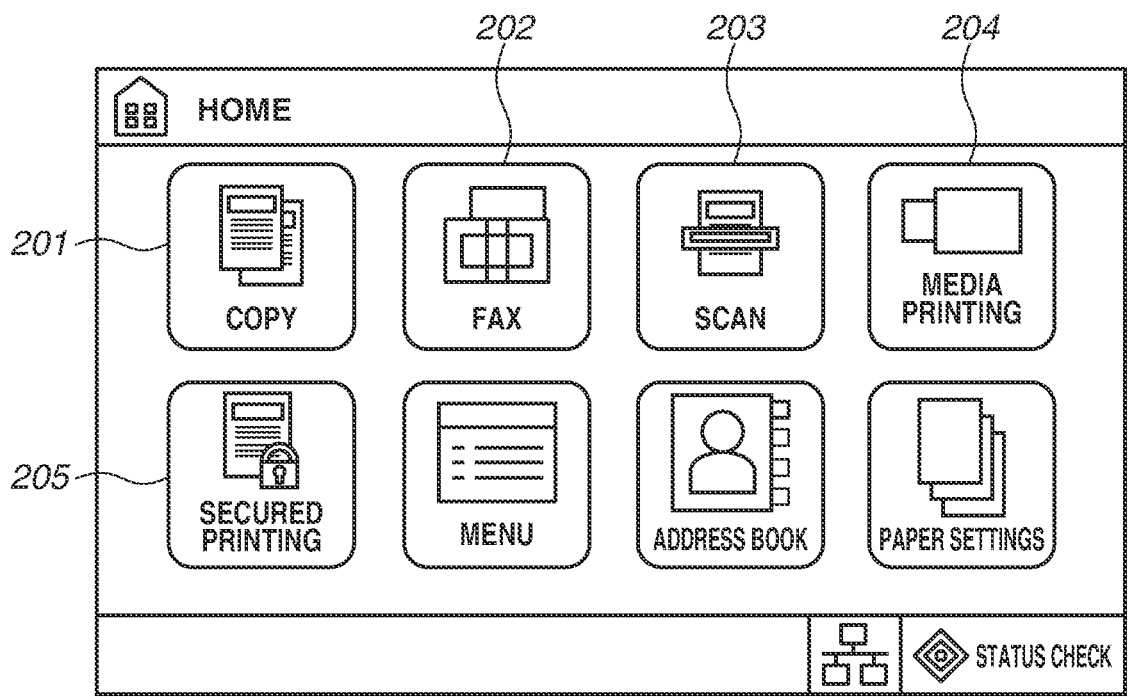
FIG. 2 illustrates an example of a home screen displayed on an operation unit according to the exemplary embodiment.

FIG. 2 illustrates an example of a home screen displayed on the operation unit 104. The home screen is displayed on the display of the operation unit 104 immediately after the multifunction peripheral 100 is activated or when the user selects a home button arranged on the operation unit 104 or a home screen key displayed on the display of the operation unit 104.

The home screen displays icons used to activate applications that operate on the multifunction peripheral 100. For example, an icon 201 is used to activate a copy application for copying a document by operating the scanner 105 and the printer 106. An icon 202 is used to activate a fax application for reading a document by operating the scanner 105 and then faxing the generated image data. An icon 203 is used to activate a scan application for reading a document by operating the scanner 105, storing the generated image data in a memory of the multifunction peripheral 100 or an external memory connected to the multifunction peripheral 100 or transmitting the image data to another apparatus by e-mail. An icon 204 is used to activate a media printing application for printing the image data stored in a memory attached to the multifunction peripheral 100, by operating the printer 106. An icon 205 is used to activate a secured printing application for printing an image with a set password input by the user by using a printer driver. As described above, the home screen displays icons for activating various applications provided by the multifunction peripheral 100. Applications are not limited to the above-described ones.

When the user taps an icon displayed on the home screen, the application associated with the icon is activated, and a screen for the application is displayed. By performing various settings in the displayed screen, the user is able to perform various functions mounted on the multifunction peripheral 100. Depending on the screen, operation settings such as the power-saving transition time stored in the ROM 102 of the multifunction peripheral 100 can be changed.

Referring to FIG. 2, the home screen displays eight different icons. When more than eight icons are displayed in the home screen, icons to be displayed may be changed through a drag operation or a flick operation.

Referring to FIG. 2, each of the icons displayed in the home screen is used to activate an application of the multifunction peripheral 100 according to setting values set as default values for the device. The home screen may display an icon of a shortcut key for activating an application based on setting values set by the user. When a shortcut key is selected, for example, a screen that displays setting values and prompts the user to determine whether to execute a job (described below with reference to FIG. 11) is displayed.

Figure 3:
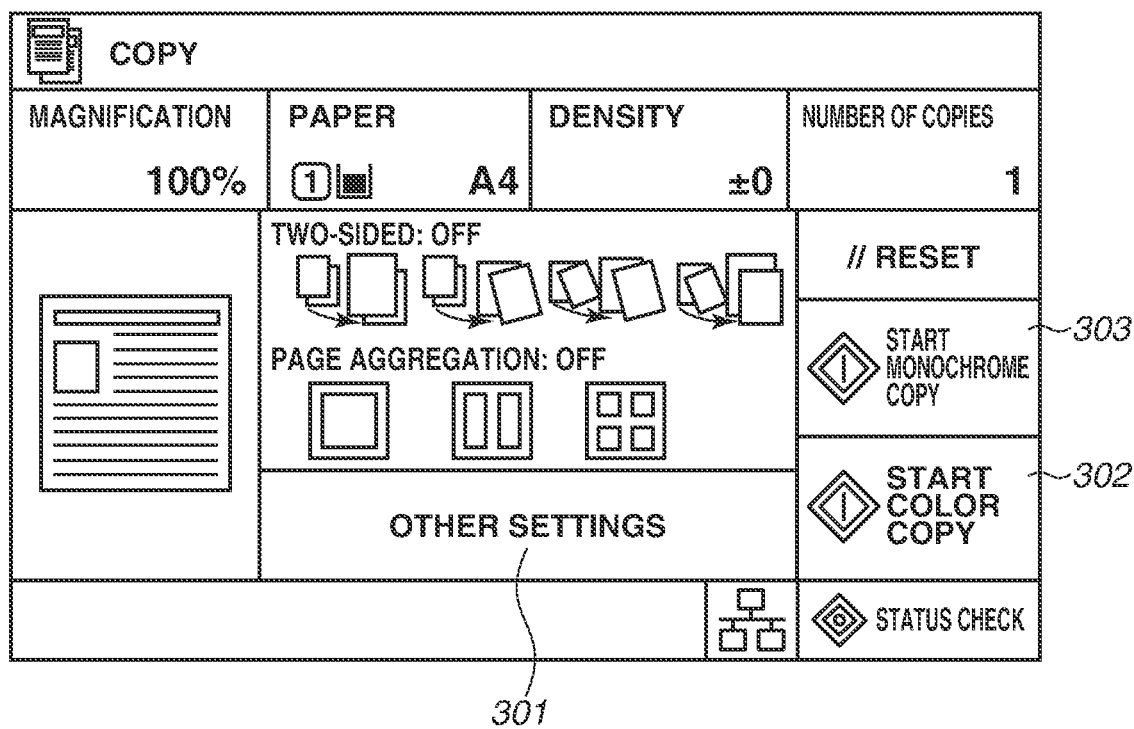
FIG. 3 illustrates an example of an application screen displayed on the operation unit according to the exemplary embodiment.

FIG. 3 illustrates an example of a copy screen as an application screen displayed on the operation unit 104. When the icon 201 in the home screen illustrated in FIG. 2 is selected, the copy screen is displayed on the operation unit 104. The copy screen enables the user to check and change the basic settings of the copy function to be executed by the multifunction peripheral 100, such as the magnification, density, number of copies, and printing side, and to issue an instruction for executing the copy function to the multifunction peripheral 100. FIG. 3 illustrates an example of a screen displayed when the copy application is activated. Each of the plurality of applications operating on the multifunction peripheral 100 has a screen to be displayed when the application is activated.

FIG. 4 illustrates an example of a copy detail setting screen displayed on the operation unit 104. The copy detail setting screen is a screen one-level lower than the copy screen illustrated in FIG. 3 and enables the user to check and change detailed settings of the copy function. The copy detail setting screen is displayed upon selection of an "other settings" button 301 in the copy screen illustrated in FIG. 3.

The copy detail setting screen also enables the user to set items unsettable in the copy screen in FIG. 3. Examples of the items unsettable in the copy screen include selection of the document type to be read (e.g., text, photograph, or map) and selection of whether to use a mixed document function for continuously reading documents with different sizes.

Likewise, applications other than the copy application each have a detail setting screen for setting items unsettable in the setting screen displayed when the application is activated.

Figure 5:
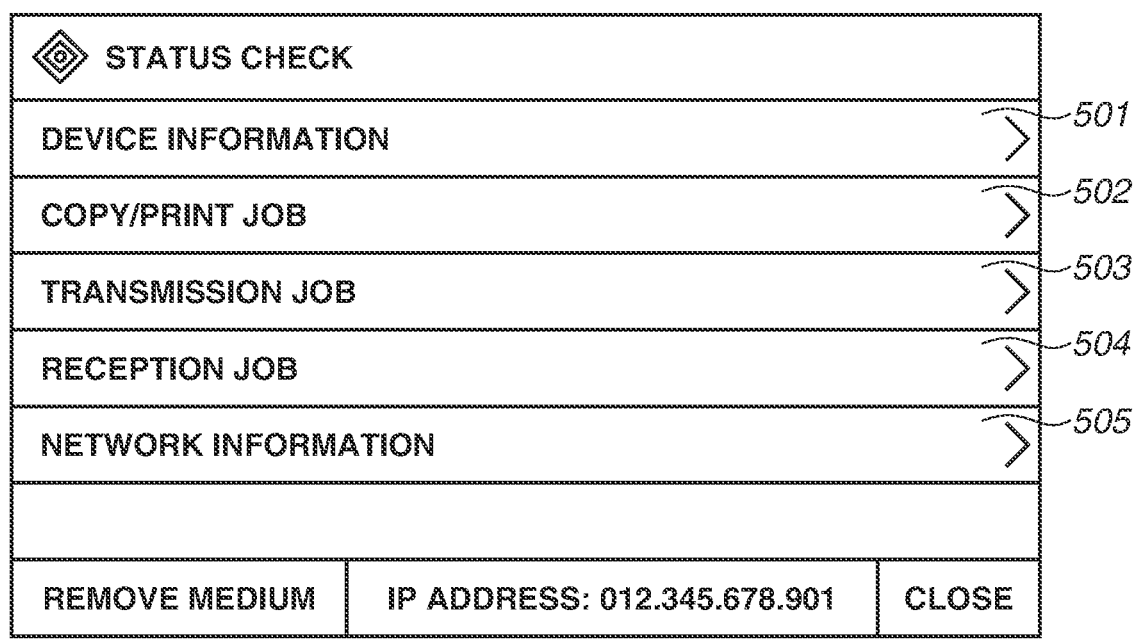
FIG. 5 illustrates an example of a status check screen displayed on the operation unit according to the exemplary embodiment.

FIG. 5 illustrates an example of a status check screen displayed on the operation unit 104. The status check screen enables the user to check operation statuses of various functions currently being executed by the multifunction peripheral 100 and the statuses of the scanner 105 and the printer 106 in the main body of the multifunction peripheral 100. "Device Information" 501 is an item for displaying a screen that displays the remaining amount of consumables used by the multifunction peripheral 100, such as paper and recording materials, and the number of days until replacement of a consumable. "Copy/print job" 502, "transmission job" 503, and "reception job" 504 are items for displaying screens that display a job history for each application and information about the job currently being executed. "Network information" 505 is an item for displaying network settings including the Internet Protocol (IP) address and the Media Access Control (MAC) address set in the multifunction peripheral 100.

When an external memory such as a Universal Serial Bus (USB) memory is connected to the multifunction peripheral 100, the user is able to instruct the apparatus to remove the USB memory by using a button displayed at the bottom of the status check screen. The IP address assigned to the communication unit 107 can also be checked by the display at the bottom of this screen.

Figure 6:
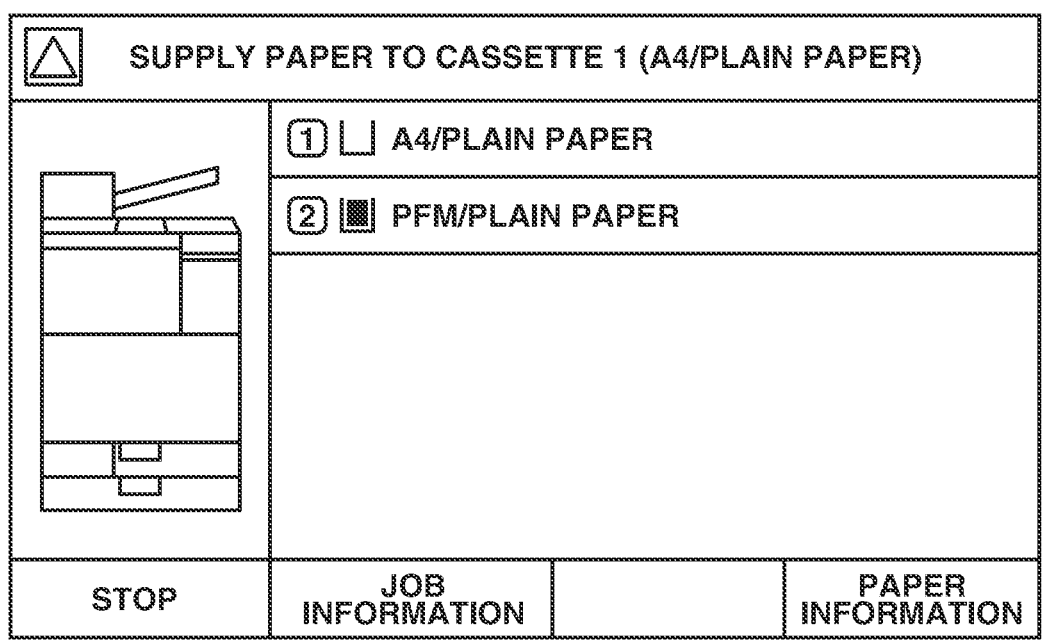
FIG. 6 illustrates an example of a paper feed warning screen displayed on the operation unit according to the exemplary embodiment.

FIG. 6 illustrates an example of a paper feed warning screen displayed on the operation unit 104. The paper feed warning screen is an example of a warning screen displayed if an anomaly occurs in a device such as the scanner 105 and the printer 106 of the multifunction peripheral 100 and the user needs to be notified of the occurrence of the anomaly. The paper feed warning screen is also displayed if paper runs out during printing. In addition to the paper feed warning screen, warning screens include a screen for prompting the user to replace a consumable, a screen for prompting the user to solve a paper jam, and a screen for notifying the user that the cover of the multifunction peripheral 100 is opened.

If paper runs out during display of any of the application screens or the status check screen illustrated in FIGS. 2 to 5, the application screen changes to the paper feed warning screen illustrated in FIG. 6.

As described above with reference to FIGS. 2 to 6, various screens are displayed on the multifunction peripheral 100. Conventionally, the user first needs to perform an operation to display the home screen illustrated in FIG. 2 to display another application screen different from the currently displayed application screen or execute another application. According to the present exemplary embodiment, when a predetermined condition is satisfied during display of a screen for a certain application, icons for activating other applications are superimposed on the currently displayed screen. The above-described screen display enables activation of another application different from the currently active application without displaying the home screen. However, while the warning screen illustrated in FIG. 6 is displayed, warning display is given priority and hence icons for activating other applications are not displayed even if the predetermined condition is satisfied.

FIG. 7 illustrates examples of a launcher area to be superimposed on an application screen. The launcher area is an area for displaying one or a plurality of icons. This launcher area is an area that includes a plurality of icons like a launcher area vertical display 700 and a launcher area horizontal display 701, i.e., a method for displaying shortcut icons in list form proposed by the present exemplary embodiment. The information processing apparatus (multifunction peripheral 100) according to the present exemplary embodiment performs control to display or not display the launcher area in the screen displayed on the operation unit 104 and superimposes the launcher area on the target screen.

The following description will be given based on an example in which shortcut keys for which setting values are registered by the user are displayed in the launcher area. For example, an icon 702 is used to issue an instruction to activate the fax application to fax a document to a preset destination address. An icon 703 is used to activate the scan application to send image data obtained by scanning a document to a preset destination address by e-mail. An icon 704 is used to activate a print application to print a pre-registered document.

According to the present exemplary embodiment, two different examples of display formats, vertical (vertically elongated) display 700 and horizontal (horizontally elongated) display 701, are used to perform the launcher area display according to the screen displayed on the operation unit 104. The display format is not limited to the two examples but may be a different format, for example, a triangular format.

The icons displayed in the launcher area illustrated in FIG. 7 are registered by the user via a screen (not illustrated). Examples of icons displayed in the launcher area include an icon for activating an application with default setting values, and a shortcut key for which setting values and data transmission destination are set by the user.

FIG. 8 illustrates an example of a table related to launcher area display permission.

If the launcher area is displayed while a warning/error screen is displayed, the intended purpose of displaying the warning/error release procedure may possibly be prevented. Also, during display of a function detail setting screen at a lower level than a screen displayed when an application is activated, the user is likely to be in the middle of a setting operation. In this case, displaying the launcher area may possibly disturb the setting operation of the user. The screens displayed by the multifunction peripheral 100 include some screens considered unsuitable for the launcher area display.

Accordingly, the information processing apparatus according to the present exemplary embodiment determines whether the current screen is a screen in which the launcher area display is permitted to be made, by using the table illustrated in FIG. 8. Although, in the present exemplary embodiment, information about the screens in which the launcher area display is permitted to be made is stored in the table at the time of factory shipment, the screens in which the launcher area display is permitted to be made may be set by the user after the shipment of the information processing apparatus 100.

"Screen identifier (ID)" in the table illustrated in FIG. 8 indicates identification information about a screen to be displayed on the operation unit by the multifunction peripheral 100. Using the screen ID can prevent the launcher area from being displayed when the user needs to be notified that a consumable needs to be replenished, like the screen illustrated in FIG. 6, or that a paper jam needs to be solved.

"Permission level lower limit" is information indicating up to which level below the screen displayed at activation of each application the launcher area display is permitted. Setting the permission level lower limit prevents the launcher area to be displayed while the user is making detailed settings for each application as illustrated in FIG. 4, thereby preventing the user setting operation from being interrupted.

"Display orientation" is information indicating in which area the launcher area is to be displayed. When the launcher area is displayed, a part of the current screen is hidden by the launcher area. Therefore, the information processing apparatus (multifunction peripheral 100) according to the present exemplary embodiment changes the position of the launcher area display for each of the screens being displayed. This prevents the launcher area from hiding information in the current screen, more specifically, buttons and pieces of information that are desirably not to be hidden by the launcher area. Examples of buttons and pieces of information that are desirably not to be hidden by the launcher area include a start color copy button 302 and a start monochrome copy button 303 in FIG. 3 for starting a copy function. In a case of the copy screen illustrated in FIG. 3, the vertical launcher area is displayed on the left side of the screen to prevent the start copy buttons 302 and 303 from being hidden. Examples of buttons and pieces of information that are desirably not to be hidden by the launcher area include the IP address display and the "remove medium" button for removing an external storage device illustrated in FIG. 5. Thus, the horizontal launcher area is displayed from the upper side of the screen while the status check screen illustrated in FIG. 5 is displayed.

A display permission screen table 800 consists of elements of "screen ID", "permission level lower limit", and "display orientation". According to the present exemplary embodiment, as an example, the display permission screen table 800 stores these pieces of information for four different table elements 801 to 804.

The table element 801 indicates permitted content for the home screen. More specifically, the launcher area display is permitted to be performed from the right side and up to the first display level.

The table element 802 indicates permitted content for the copy screen. More specifically, the launcher area display is permitted to be performed from the left side and up to the first display level.

The table element 803 indicates permitted content for the status check screen. More specifically, the launcher area display is permitted to be performed from the top and up to the first display level.

The table element 804 indicates permitted content for the fax screen. More specifically, the launcher area display is permitted to be performed from the left side and up to the first display level.

FIG. 9 illustrates examples of the launcher area display in the copy screen illustrated in FIG. 3. The information processing apparatus according to the present exemplary embodiment displays the launcher area when no user operation is accepted for a predetermined time period during the display of the copy screen illustrated in FIG. 3. As illustrated in screens 900, 901, and 902 in FIG. 9, the launcher area display ratio gradually increases in this order, i.e., the launcher area appears from the left side of the screen and eventually reaches the state of the screen 902. The launcher area display ratio gradually changes from 0% to 100%. FIG. 9 illustrates three different states of the copy screen with the 0%, 50%, and 100% launcher area display ratios in the launcher area vertical display format.

The screen 900 with the 0% launcher area display ratio indicates a status before the launcher area is displayed. In this state before the launcher area display, the launcher area is not displayed on the operation unit 104. When no user operation is accepted and no screen transition is made for a predetermined time period, the launcher area display is started. The above-described predetermined time period to display the launcher area may be determined at the time of factory shipment or through a user operation after shipment. The launcher area display may be started when no user operation is accepted for a predetermined time period regardless of whether a screen transition is made.

The screen 901 indicates a state where the launcher area display has been started and the launcher area display ratio has reached 50%. More specifically, the launcher area display is started from the left side of the screen according to the element 802 in the display permission screen table 800 illustrated in FIG. 8, and 50% of the entire launcher area is displayed.

The screen 902 indicates a state where a certain time period has elapsed from the state of the screen 901, and the launcher area display ratio has reached 100%. In this manner, after the launcher area display is started, a part of the launcher area is displayed and the display area gradually increases. At this time, since the launcher area is displayed on the left side of the screen, the start copy buttons 302 and 303 are not hidden. In the screen 902, the user can select an icon in the launcher area to activate the corresponding application. When the user performs a touch operation outside the launcher area, the launcher area is hidden and the screen 900 is displayed again. When the display screen on the operation unit 104 returns to the screen 900, the user is able to perform a touch operation on the screen 900.

Referring to FIG. 9, the launcher area is displayed from the left side of the screen. In a case where the launcher area is displayed from the right side of the screen, the launcher area display equivalent to the example in FIG. 9 is started from the right side of the screen. The screen transition performed when the user clicks on an icon in the launcher area will be described below.

An example in which the horizontal launcher area is displayed will be described below with reference to FIG. 10.

FIG. 10 illustrates an example of the launcher area display in the status check screen illustrated in FIG. 5.

A description is given of the launcher area horizontal display format using three different states of the status check screen with the 0%, 50%, and 100% launcher area display ratios as examples.

A screen 1000 illustrates a state with the 0% launcher area display ratio. Since the launcher area display has not yet been started, the launcher area is not displayed on the operation unit 104.

The launcher area display is started when no job is received via a network and no user operation is accepted for a predetermined time period in a state where the screen 1000 is displayed. A screen 1001 illustrates a state with the 50% launcher area display ratio. As illustrated in the table element 803 in the display permission screen table 800, a half of the launcher area has been displayed from the top of the operation unit 104.

Then, a screen 1002 is displayed when a predetermined time period has elapsed in a state where the screen 1001 is displayed. The screen 1002 illustrates a state with the 100% launcher area display ratio. At this time, since the launcher area is displayed at the top of the operation unit 104, the launcher area does not hide the IP address display or the "remove medium" (external storage device removal) button which are most important portions of the status check screen.

Referring to FIG. 10, the launcher area is displayed from the top. When the launcher area is displayed from the bottom, the launcher area display equivalent to the example in FIG. 10 is started from the bottom of the screen. The screen transition performed when the user clicks on an icon in the launcher area will be described below.

Figure 11:
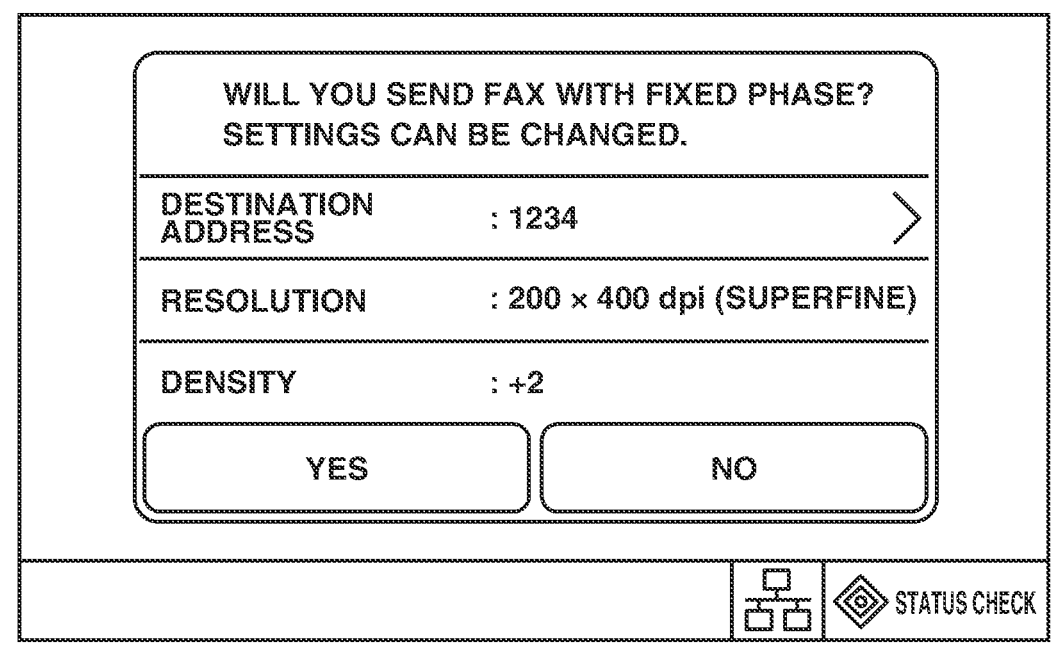

FIG. 11 illustrates an example of a screen displayed when the user selects an icon in the launcher area. The screen in FIG. 11 is displayed when the user selects the icon "send fax to fixed destination address" in the screen 902 or 1002 with the 100% launcher area display ratio. When the user selects a "Yes" button, a fax is sent to the destination address "1234". When the user selects a "No" button, a fax setting screen in a state where the setting values illustrated in FIG. 11 are set is displayed to allow the user to change the fax settings. Referring to FIG. 11, the display screen has been changed to the "send fax to fixed destination address" screen and the launcher area is not displayed. The screen in FIG. 11 has been described above based on a case where the selected icon corresponds to a shortcut key with the setting values pre-registered. When the user selects an icon displayed in the launcher area, corresponding to any one of the icons 201 to 205 in FIG. 2, the same screen as the one displayed when an application is activated from the home screen illustrated in FIG. 2 is displayed.

FIG. 12 illustrates an example of a display speed table 1200 representing the relation between the launcher area display speed and the display completion time. The user can set the function to ON or OFF and select the launcher area display speed for the launcher area display in a similar way to common setting items such as the power-saving function setting of the multifunction peripheral 100. In this case, the launcher area display speed means the time taken since the launcher area display starts until the launcher area display ends.

The display speed table 1200 includes a display speed Ls that the user can select and a display completion time Et associated with the display speed Ls. According to the present exemplary embodiment, the user selects the launcher area display speed from three different options: Fast, Normal, and Slow.

A table element 1201 defines the display completion time Et in the high-speed (Fast) display mode, and the display completion time Et in this case is 2 seconds as an example. This means that it takes 2 seconds since the launcher area display is started until the launcher area display ratio reaches 100%.

A table element 1202 defines the display completion time Et in the medium-speed (Normal) display mode, and the display completion time Et in this case is 5 seconds as an example. This means that it takes 5 seconds since the launcher area display is started until the launcher area display ratio reaches 100%.

A table element 1203 defines the display completion time Et in the low-speed (Slow) display mode, and the display completion time Et in this case is 10 seconds as an example. This means that it takes 10 seconds since the launcher area display is started until the launcher area display ratio reaches 100%.

The display speed table 1200 includes the table element 1201 (high speed), the table element 1202 (medium speed), and the table element 1203 (low speed), the number of elements, the display speed Ls, and the display completion time Et are not limited thereto but may be arbitrarily changed.

Figure 13:
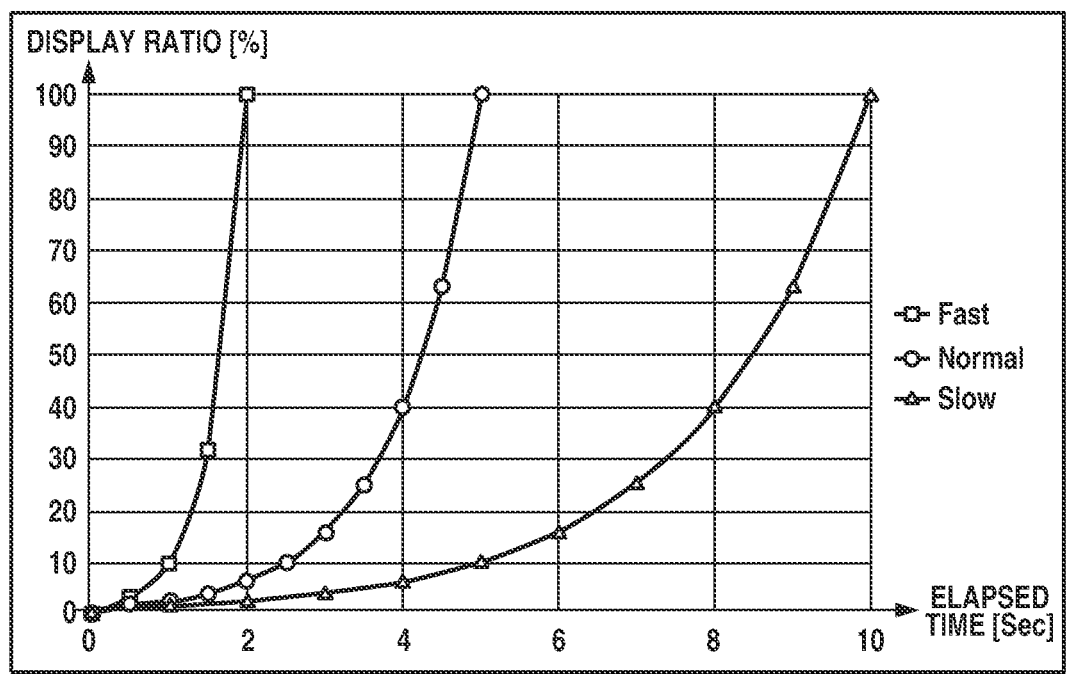
FIG. 13 illustrates a launcher area display ratio calculation formula and examples calculation results for different settings according to the exemplary embodiment.

FIG. 13 illustrates a display ratio calculation formula 1300 for the launcher area display and a calculation result 1301 for each of the settings. The launcher area display ratio is calculated by assigning the elapsed time since the launcher area display is started and the display completion time Et defined in the display speed table 1200 to the exponential function in the display ratio calculation formula 1300 for the launcher area display. The calculation result 1301 is a result obtained by applying the display ratio calculation formula 1300 for the launcher area display to each of the table elements 1201 to 1203 in the display speed table 1200.

The calculation result 1301 indicates that the way the launcher area is displayed until the launcher area display ratio reaches 100% differs between the Fast, Normal, and Slow display speeds. Although common to all display speeds, the display ratio gently increases at the initial stage and then steeply increases as the elapsed time becomes closer to the display completion time Et, due to calculation using an exponential function. This makes it possible to control the display ratio such that the launcher area slowly and partially appears at the initial stage and then the entire launcher area is quickly displayed at the end. The display ratio calculation formula 1300 is merely an illustrative example. The calculation method may be arbitrarily changed to a method using a linear function or a quadratic function.

Figure 14:
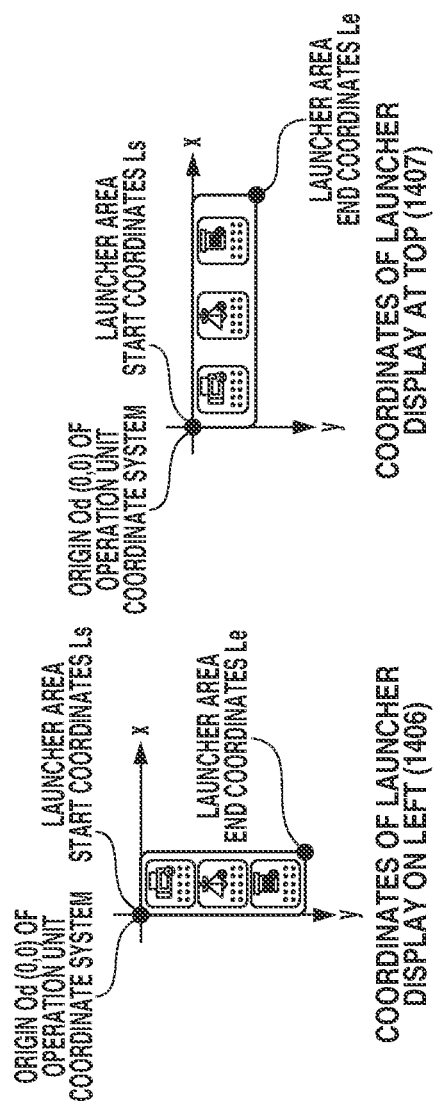
FIG. 14 are a table and schematic views illustrating the relation between start and end coordinates of the launcher area display and the operation unit according to the exemplary embodiment.

FIG. 14 illustrates a launcher area size table 1400 that represents the relation between the start and end coordinates of the launcher area display and the operation unit 104. FIG. 14 also schematically illustrates examples of the launcher area displayed for each element in the launcher area size table 1400. The launcher area size table 1400 stores information about the size and the position of the launcher area to be displayed in each screen for each display orientation in the display permission screen table 800.

Since the launcher area is displayed on the operation unit 104 and responds to a touch operation by the user, the display area coordinates are to be based on the origin of the operation unit coordinate system. Further, since the launcher area coordinates when the launcher area display is the 100% completed differ depending on the launcher area display orientation, the launcher area coordinates need to be defined for each display orientation.

The launcher area size table 1400 thus includes the display orientation, the X- and the Y-coordinates of the launcher area start coordinates Ls, and the X- and the Y-coordinates of the launcher area end coordinates Le.

As illustrated in a maximum displayable area 1405 of the operation unit 104, the operation unit 104 has a width DISP_WID_MAX and a height DISP_HEI_MAX. The launcher area has an initial setting width DEF_LAUNCH_WID and an initial setting height DEF_LAUNCH_HEI. The following description will be made on the premise that the origin at the upper left position is the origin of the operation unit coordinate system. The values of the DEF_LAUNCH_WID and DEF_LAUNCH_HEI can be arbitrarily changed.

A table element 1401 indicates the launcher area start coordinates Ls and the launcher area end coordinates Le when the launcher area is displayed from the left side and the height of the launcher area corresponds to the height of the operation unit 104. In this case, the start coordinates Ls and the end coordinates Le are as illustrated by coordinates 1406 of the launcher area displayed on the left.

A table element 1402 indicates the launcher area start coordinates Ls and the launcher area end coordinates Le when the launcher area is displayed from the top and the width of the launcher area corresponds to the width of the operation unit 104. In this case, the start coordinates Ls and the end coordinates Le are as illustrated by coordinates 1407 of the launcher area displayed at the top.

A table element 1403 indicates the launcher area start coordinates Ls and the launcher area end coordinates Le when the launcher area is displayed from the right side and the height of the launcher area corresponds to the height of the operation unit 104. In this case, the start coordinates Ls and the end coordinates Le are as illustrated by coordinates 1409 of the launcher area displayed on the right.

A table element 1404 indicates the launcher area start coordinates Ls and the launcher area end coordinates Le when the launcher area is displayed from the bottom and the width of the launcher area corresponds to the width of the operation unit 104. In this case, the start coordinates Ls and the end coordinates Le are as illustrated by coordinates 1408 of the launcher area displayed at the bottom.

FIG. 15 illustrates a launcher area vertical display icon table 1500 and a launcher area horizontal display icon table 1504 that each represent the relation between the start and end coordinates of the icon display within the launcher area and the launcher area. FIG. 15 also schematically illustrates the launcher area corresponding to each table. Since the launcher area includes a plurality of icons, it is necessary to determine which icon the user has touched, acquire the corresponding screen ID, and make a screen transition. It is also necessary to define icon coordinates for each display format since the icon coordinates in the launcher area depend on whether the launcher area is to be vertically or horizontally displayed.

Thus, the launcher area vertical display icon table 1500 and the launcher area horizontal display icon table 1504 each include the icon screen ID, the X- and the Y-coordinates of the icon area start coordinates, and the X- and the Y-coordinates of the icon area end coordinates.

In the tables 1500 and 1504, DEF_LM denotes the margin between the launcher area left edge and the icon area left edge, and DEF_TM denotes the margin between the launcher area top edge and the icon area top edge. Further, DEF_V_INTVL denotes the vertical gap between icon areas, DEF_H_INTVL denotes the horizontal gap between icon areas, DEF_ICON_HEI denotes the height of the icon area, and DEF_ICON_WID denotes the width of the icon area. The following description will be given on the premise that these icon coordinates belong to the launcher area coordinate system, that the origin at the upper left position is the origin of the launcher area coordinate system, and that the three icons in FIG. 7 are displayed in the launcher area.

The launcher area vertical display icon table 1500 represents the icon coordinates when the launcher area vertical display is made on the left or the right side.

A table element 1501 indicates the icon screen ID, the icon area start coordinates Itbs, and the icon area end coordinates Itbe of the "send fax to fixed destination address" icon.

A table element 1502 indicates the icon screen ID, the icon area start coordinates Itbs, and the icon area end coordinates Itbe of the "send fax with fixed phrase" icon.

A table element 1503 indicates the icon screen ID, the icon area start coordinates Itbs, and the icon area end coordinates Itbe of the "print fixed phrase" icon.

If the icons are arranged according to the start coordinates Itbs and the end coordinates Itbe for each icon, a launcher area vertical display 1508 is displayed.

The launcher area horizontal display icon table 1504 represents the icon coordinates when the launcher area horizontal display is made at the top or at the bottom.

A table element 1505 indicates the icon screen ID, the icon area start coordinates Itbs, and the icon area end coordinates Itbe of the "send fax to fixed destination address" icon.

A table element 1506 indicates the icon screen ID, the icon area start coordinates Itbs, and the icon area end coordinates Itbe of the "send fax with fixed phrase" icon.

A table element 1507 indicates the icon screen ID, the icon area start coordinates Itbs, and the icon area end coordinates Itbe of the "print fixed phrase" icon.

A launcher area horizontal display 1509 is displayed if the icons are arranged according to the start coordinates Itbs and the end coordinates Itbe for each icon.

Figure 16:
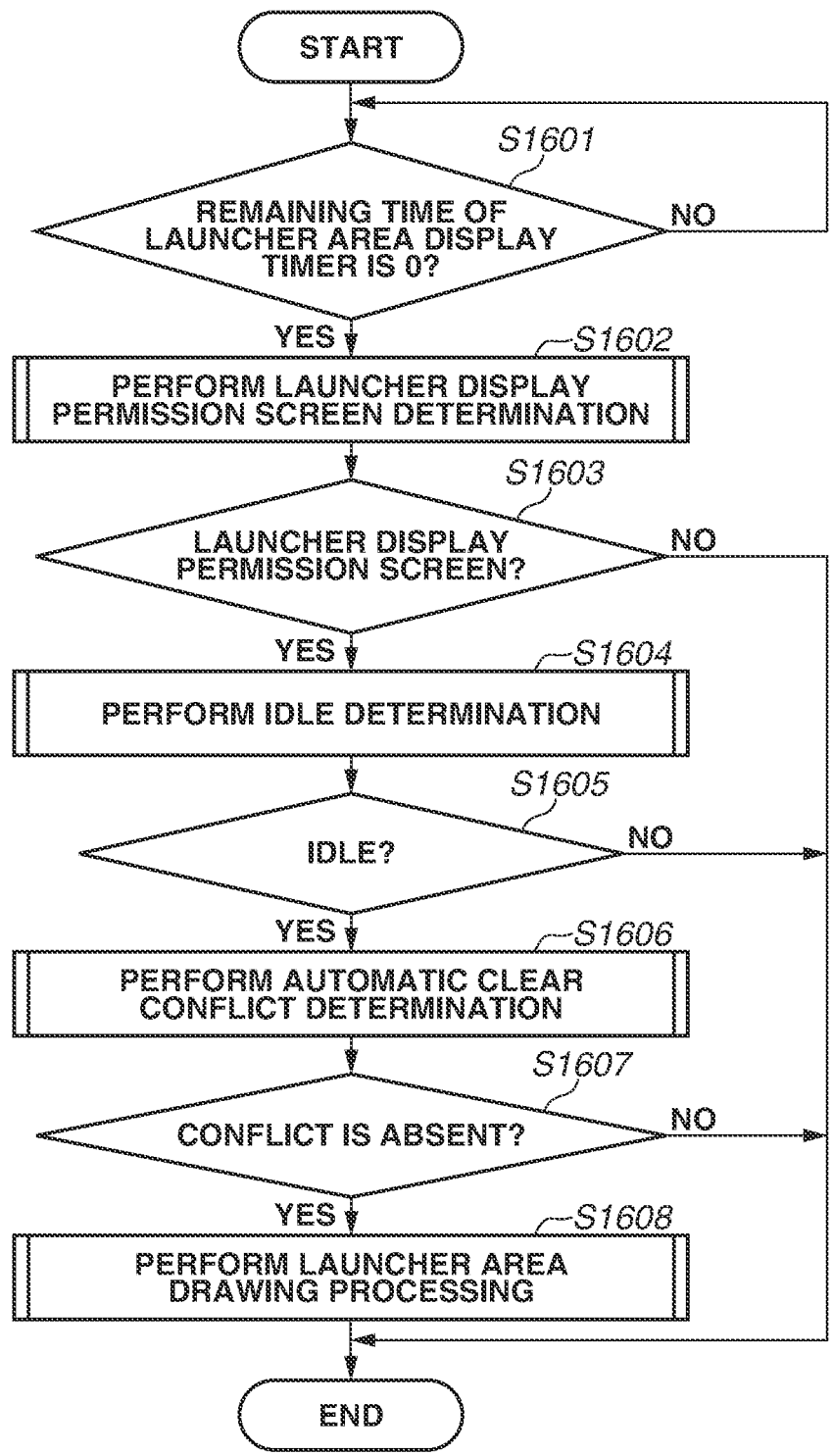
FIG. 16 is a flowchart illustrating an example of processing of display control for the launcher area display according to the exemplary embodiment.

Processing for displaying the launcher area will be described in detail below with reference to FIG. 16. FIG. 16 is a flowchart illustrating display control for the launcher area display. Processing illustrated in FIG. 16 is implemented when the CPU 101 of the multifunction peripheral 100 loads a program stored in the ROM 102 and executes the program.

The launcher area display is activated when the user performs no screen operation and no screen transition is made by the automatic clear function for a predetermined time period.

In this case, it is detected whether the user performs no screen operation for a predetermined time period based on the expiration of a timer. Then, the timer is enabled when the user performs a tap-out operation on the operation unit 104 or after completion of the screen transition. The timer operates according to the user-set time as the remaining time until the start of the launcher area display. After power of the multifunction peripheral 100 is turned ON, or when the user operates the multifunction peripheral 100 to set the timer or the timer is set by the automatic clear function, the multifunction peripheral 100 starts the processing illustrated in FIG. 16.

FIG. 16 is a flowchart illustrating launcher area display control performed when the timer expires or when the timer remaining time is set again.

In step S1601, the CPU 101 determines whether the remaining time of the launcher area display timer is 0. The CPU 101 determines that the remaining time of the timer is 0 when no user operation on the operation unit 104 is accepted and no screen transition by the automatic clear function is made for a preset predetermined time period. When the remaining time of the timer is not 0 (NO in step S601), the CPU 101 determines the remaining time of the timer again since the CPU 101 needs to wait for the expiration of the timer. When the remaining time of the timer is 0, i.e., the timer has expired (YES in step S1601), the processing proceeds to step S1602. The timer referred to in step S1601 is used to determine whether to display the launcher area. When a user touch operation is accepted or a screen transition is made through the execution of the automatic clear function, the remaining time of the timer is cleared and the timer starts measurement again. The present exemplary embodiment will be described below centering on the use of the timer that performs countdown. However, a timer for measuring the elapsed time may be used to measure a time period during which no user operation is accepted and no screen transition is made. In this case, the CPU 101 performs the determination equivalent to step S1601 based on whether the measured time has reached a set processing time.

In step S1602, the CPU 101 performs the launcher display permission screen determination to determine whether the launcher area display is permitted to be made in the current screen. Then, the processing proceeds to step S1603. This determination processing will be described in detail below with reference to another flowchart.

In step S1603, the CPU 101 determines whether the launcher area display is permitted based on the result of the determination in step S1602. When the CPU 101 determines that the launcher area display is permitted to be performed in the current screen (YES in step S1603), the processing proceeds to step S1604. On the other hand, when the CPU 101 determines that the launcher area display is not permitted to be performed in the current screen (NO in step S1603), the processing in the flowchart in FIG. 16 is ended.

In step S1604, the CPU 101 performs idle determination processing to determine whether the multifunction peripheral 100 is in the idle state where no function is executed. Then, the processing proceeds to step S1605. This determination processing will be described in detail below with reference to another flowchart.

In step S1605, the CPU 101 determines whether the multifunction peripheral 100 is in the idle state based on the result of the determination in step S1604. When the CPU 101 determines that the multifunction peripheral 100 is in the idle state (YES in step S1605), the processing proceeds to step S1606. On the other hand, when the CPU 101 determines that the multifunction peripheral 100 is not in the idle state (NO in step S1605), the processing in this flowchart is ended.

In step S1606, the CPU 101 performs automatic clear conflict determination processing to determine whether the conflict with the automatic clear function is present or absent. Then, the processing proceeds to step S1607. This determination processing will be described in detail below with reference to another flowchart.

In step S1607, the CPU 101 determines whether the conflict is absent based on the result of the determination in step S1606. When the CPU 101 determines that the conflict with the automatic clear function is absent (YES in step S1607), the processing proceeds to step S1608. On the other hand, when the CPU 101 determines that the conflict with the automatic clear function is present (NO in step S1607), the processing in this flowchart is ended.

In step S1608, the CPU 101 performs the launcher area drawing processing to draw the launcher area. Then, the processing in this flowchart is ended. This drawing processing will be described in detail below with reference to another flowchart.

Figure 17:
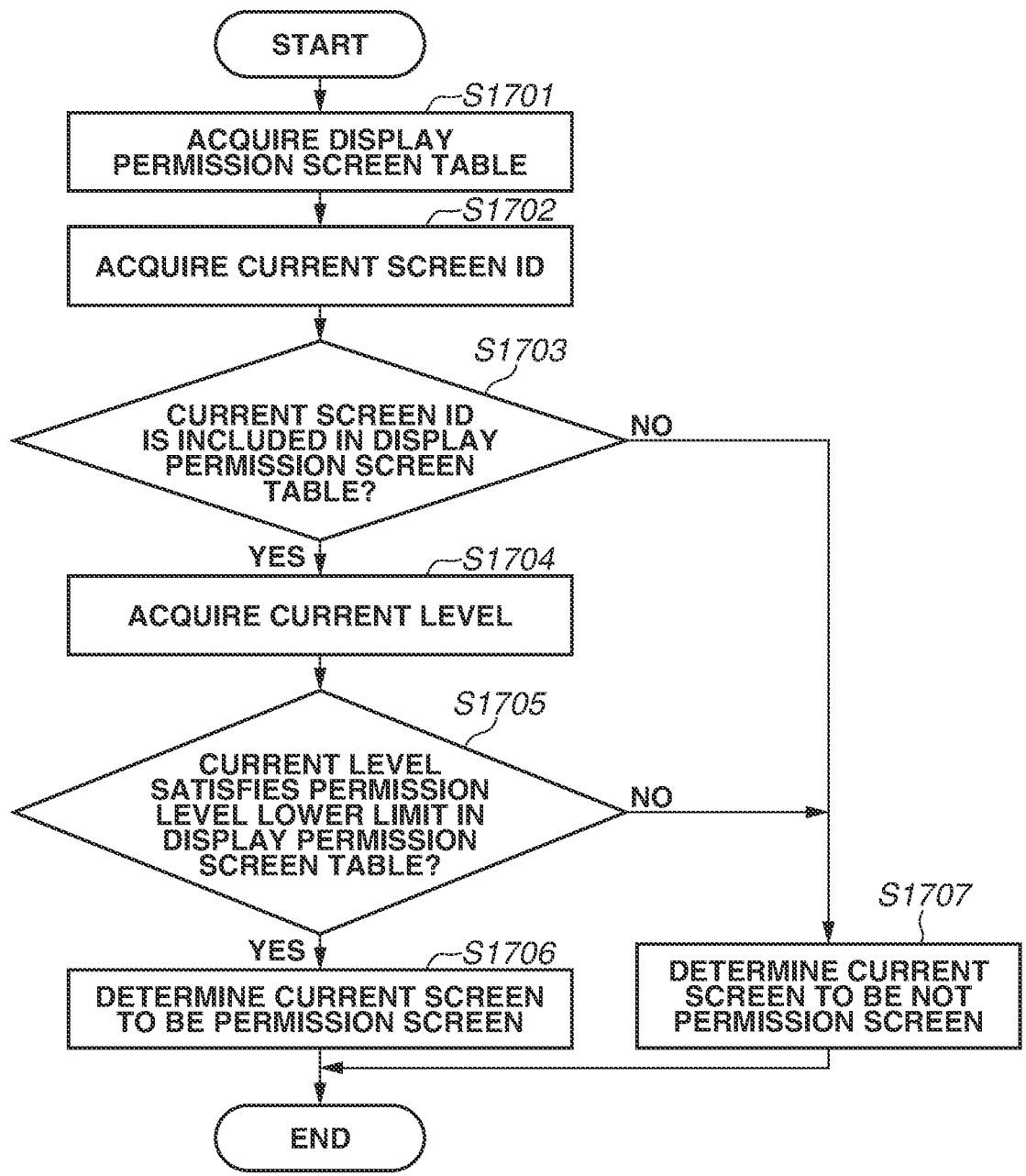
FIG. 17 is a flowchart illustrating an example of processing of display permission screen determination for the launcher area display according to the exemplary embodiment.

FIG. 17 is a flowchart illustrating the display permission screen determination for the launcher area display. This flowchart determines whether the launcher area display is permitted to be performed in the screen currently displayed on the operation unit 104. FIG. 17 illustrates detailed processing performed in step S1602 illustrated in FIG. 16. The processing illustrated in FIG. 17 is implemented when the CPU 101 loads a program stored in the ROM 102 and executes the program.

In step S1701, the CPU 101 acquires the display permission screen table 800 illustrated in FIG. 8. Then, the processing proceeds to step S1702.

In step S1702, the CPU 101 acquires the screen ID of the screen currently displayed on the operation unit 104. Then, the processing proceeds to step S1703.

In step S1703, the CPU 101 compares the current screen ID acquired in step S1702 with the screen IDs registered in the display permission screen table 800 to determine whether the screen ID of the currently displayed screen is included in the display permission screen table 800 acquired in step S1701. When the screen ID of the current screen is included in the display permission screen table 800 (YES in step S1703), the processing proceeds to step S1704. On the other hand, when the screen ID of the current screen is not included in the display permission screen table 800 (NO in step S1703), the processing proceeds to step S1707. This processing enables performing such control to display the launcher area while, for example, the screen displayed when the copy application is activated is being displayed as illustrated in FIG. 3, and not to display the launcher area while the warning screen as illustrated in FIG. 6 is being displayed.

In step S1704, the CPU 101 acquires the screen level of the screen currently displayed on the operation unit 104. Then, the processing proceeds to step S1705.

In step S1705, the CPU 101 determines whether the screen level acquired in step S1704 satisfies the permission level lower limit in the display permission screen table 800 acquired in step S1701. When the screen level acquired in step S1704 satisfies the permission level lower limit in the display permission screen table 800 (YES in step S1705), the processing proceeds to step S1706. On the other hand, when the screen level acquired in step S1704 does not satisfy the permission level lower limit in the display permission screen table 800 (NO in step S1705), the processing proceeds to step S1707.

In step S1706, the CPU 101 determines the current screen as a permission screen, and stores a flag indicating that the launcher area display is permitted to be performed in the current screen, in the DRAM 103. Then, the processing in this flowchart is ended.

In step S1707, the CPU 101 determines that the current screen is not a permission screen, and stores a flag indicating that the launcher area display is not permitted to be performed in the current screen, in the DRAM 103. Then, the processing in this flowchart is ended.

The processing illustrated in FIG. 17 will be specifically described below with reference to FIGS. 3 and 4. FIG. 3 illustrates a screen having the screen ID "DISP_COPY" and the screen level "HIER_FIRST". FIG. 4 illustrates a screen having the screen ID "DISP_COPY" and the screen level "HIER_SECOND". In a case where any of the screen in FIG. 3 or the screen in FIG. 4 is currently displayed, the screen ID "DISP_COPY" is acquired in step S1702, and it is determined in step S1703 that the screen ID of the currently displayed screen is included in the display permission screen table 800. However, the information about the screen level of the current screen acquired in step S1704 differs between the screens in FIGS. 3 and 4. Thus, in step S1705, the CPU 101 determines that the screen level satisfies the permission level lower limit for the screen in FIG. 3, and determines that the screen level does not satisfy the permission level lower limit for the screen in FIG. 4. Accordingly the launcher area display is performed in a case where the screen in FIG. 3 is displayed, and the launcher area display is not performed in a case where the screen in FIG. 4 is displayed.

By performing the processing in FIG. 17, the CPU 101 can perform control to prevent the launcher area display from being displayed when a screen having higher priority than the launcher area display is displayed or when a screen on which the user is highly likely to be performing an operation is displayed.

Figure 18:
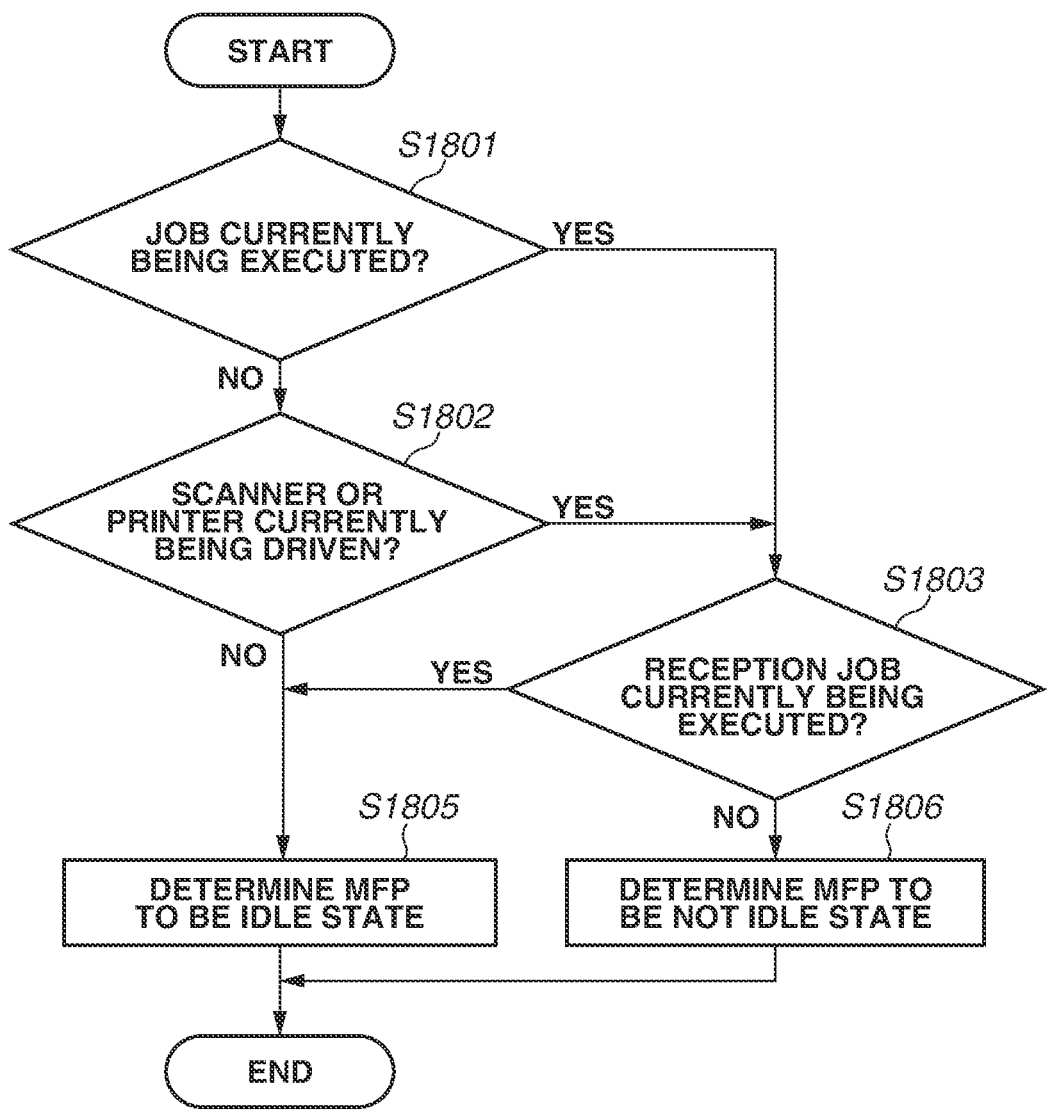
FIG. 18 is a flowchart illustrating an example of processing of idle determination for the launcher area display according to the exemplary embodiment.

FIG. 18 is a flowchart illustrating the idle determination for the launcher area display. FIG. 18 is a flowchart illustrating detailed processing of step S1604 in FIG. 16. Processing in each step of the flowchart in FIG. 18 is implemented when the CPU 101 executes a program stored in the ROM 102.

In the processing of the flowchart in FIG. 18, it is determined whether the multifunction peripheral 100 is in the idle state where no job is executed.

In step S1801, the CPU 101 determines whether a job is currently being executed during execution of a certain function. When a job is currently being executed (YES in step S1801), the processing proceeds to step S1803. On the other hand, when no job is currently being executed (NO in step S1801), the processing proceeds to step S1802.

In step S1802, the CPU 101 checks whether the scanner 105 or the printer 106 is currently being driven. When neither the scanner 105 nor the printer 106 is currently being driven (NO in step S1802), the processing proceeds to step S1805. On the other hand, when the scanner 105 or the printer 106 is currently being driven (YES in step S1802), the processing proceeds to step S1803. Even if no job is currently being executed, the scanner 105 or the printer 106 may be used to adjust the scanner 105 or the printer 106, respectively. In this case, the user is likely to operate the operation unit 104 for adjustment, so that the CPU 101 determines that the multifunction peripheral 100 is not in the idle state, and performs control not to display the launcher area.

In step S1803, the CPU 101 determines whether a reception job is currently being executed.

When a reception job is currently being executed (YES in step S1803), the processing proceeds to step S1805. On the other hand, when no reception job is currently being executed (NO in step S1803), the processing proceeds to step S1806. A reception job refers to a job for receiving print data from an information processing apparatus such as a PC, or a job for receiving and printing a fax. During execution of these jobs, the user is unlikely to be currently operating the operation unit 104 of the multifunction peripheral 100. Thus, the CPU 101 determines that the multifunction peripheral 100 is in the idle state and therefore displays the launcher area. On the other hand, during execution of a job other than a reception job, such as a copy job or a scan job, the user is likely to be currently operating the operation unit 104 to prepare a document to be read next and make settings. When the CPU 101 determines that no reception job is currently being executed in step S1803, the CPU 101 determines that the multifunction peripheral 100 is not in the idle state and performs control not to display the launcher area.

In step S1805, the CPU 101 determines that multifunction peripheral 100 is in the idle state and writes a flag indicating that the multifunction peripheral 100 is in the idle state in the DRAM 103. Then, the processing in this flowchart is ended.

In step S1806, the CPU 101 determines that the multifunction peripheral 100 is not in the idle state and writes a flag indicating that the multifunction peripheral 100 is not in the idle state in the DRAM 103. Then, the processing exits in flowchart is ended.

Figure 19:
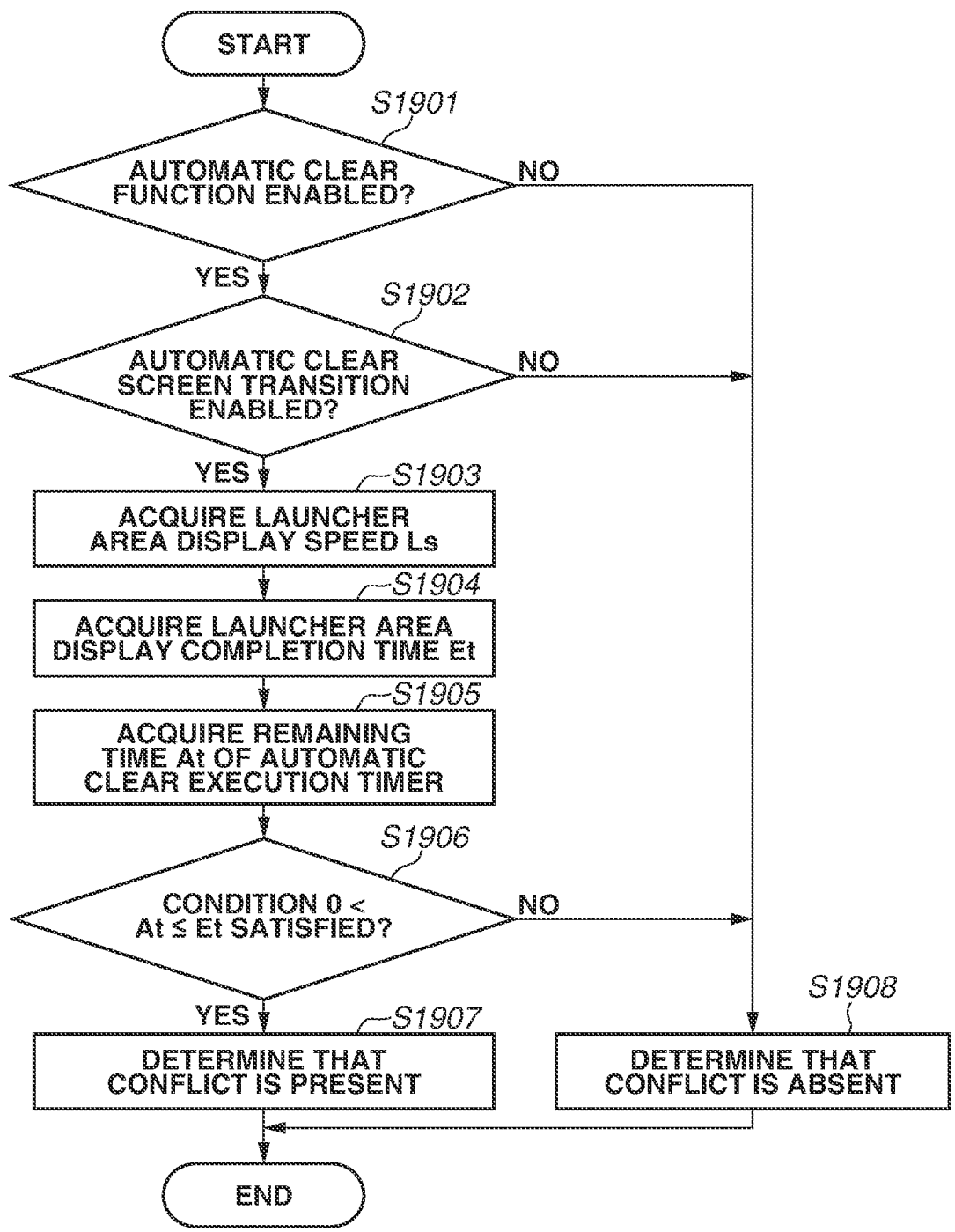
FIG. 19 is a flowchart illustrating an example of processing of automatic clear conflict determination for the launcher area display according to the exemplary embodiment.

FIG. 19 is a flowchart illustrating the automatic clear conflict determination for the launcher area display. FIG. 19 is a flowchart illustrating details of the processing in step S1606 in FIG. 16. Processing in each step of the flowchart in FIG. 19 is implemented when the CPU 101 loads a program stored in the in ROM 102 and executes the program.

The automatic clear function refers to a function of returning the setting values of the currently displayed function to the initial values when the user performs no operation on the multifunction peripheral 100 for a predetermined time period and a predetermined condition is satisfied. In some cases, a screen transition may be made from the current screen to a specific screen preset by the user depending on the settings. If a screen transition to a specific screen by the automatic clear function and the launcher area display according to the present exemplary embodiment occur at the same time, the screen transition is made during the launcher area display processing, and then the launcher area display is canceled. Therefore, even if the user attempts to press an icon displayed in the launcher area before the screen transition, the operation is disturbed by the screen transition. Thus, this flowchart determines the conflict with the automatic clear function to prevent the occurrence of the above-described situation.

In step S1901, the CPU 101 determines whether the automatic clear function is enabled. The automatic clear function is enabled or disabled by the user via a screen (not illustrated).

When the CPU 101 determines that the automatic clear function is enabled (YES in step S1901), the processing proceeds to step S1902. On the other hand, when the CPU 101 determines that the automatic clear function is not enabled (NO in step S1901), i.e., the automatic clear function is disabled, the processing proceeds to step S1908.

In step S1902, the CPU 101 determines whether the screen transition by the automatic clear function is enabled. Whether the screen transition by the automatic clear function is performed is preset by the user via a screen (not illustrated). When the screen transition by the automatic clear function is set enabled (YES in step S1902), the processing proceeds to step S1903. On the other hand, when the screen transition by the automatic clear function is not set enabled (NO in step S1902), the processing proceeds to step S1908.

In step S1903, the CPU 101 acquires a launcher area display speed Ls. Then, the processing proceeds to step S1904. In step S1903, the CPU 101 acquires Fast, Normal, or Slow in the display speed table illustrated in FIG. 12 as the launcher area display speed Ls set by the user.

In step S1904, the CPU 101 acquires a launcher area display completion time Et from the display speed table 1200 for the launcher area by using the launcher area display speed Ls acquired in step S1903. Then, the processing proceeds to step S1905.

In step S1905, the CPU 101 acquires the remaining time At of an automatic clear execution timer. Then, the processing proceeds to step S1906.

In step S1906, the CPU 101 compares the launcher area display completion time Et acquired in step S1904 with the remaining time At of the automatic clear execution timer acquired in step S1905 to determine whether a condition $0 < At \leq Et$ is satisfied. When the condition $0 < At \leq Et$ is satisfied in step S1906, the screen transition will occur in a period from when the launcher area display is started to when the launcher area display reaches 100%. In this case, the CPU 101 thus performs control not to display the launcher area. When the above-described condition is satisfied (YES in step S1906), the processing proceeds to step S1907. On the other hand, when the above-described condition is not satisfied (NO in step S1906), the processing proceeds to step S1908.

In step S1907, the CPU 101 determines that the launcher area display processing conflicts with the screen transition by the automatic clear function, and stores a flag indicating that the launcher area display conflicts with the screen transition by the automatic clear function in the DRAM 103. Then, the processing in this flowchart is ended. According to the exemplary embodiment, the conflict between the launcher area display processing and the screen transition by the automatic clear function means a state where the automatic clear time expires in a period from when the launcher area display is started to when the entire launcher area is displayed, and transition of a screen displayed on the operation unit 104 is made.

In step S1908, the CPU 101 determines that the launcher area display processing does not conflict with the screen transition by the automatic clear function, and stores a flag indicating that the launcher area display does not conflict with the screen transition by the automatic clear function in the DRAM 103. Then, the processing in this flowchart is ended. The state where the launcher area display processing does not conflict with the screen transition by the automatic clear function means that the screen transition by the automatic clear function is not performed before the entire launcher area is displayed.

Figure 20:
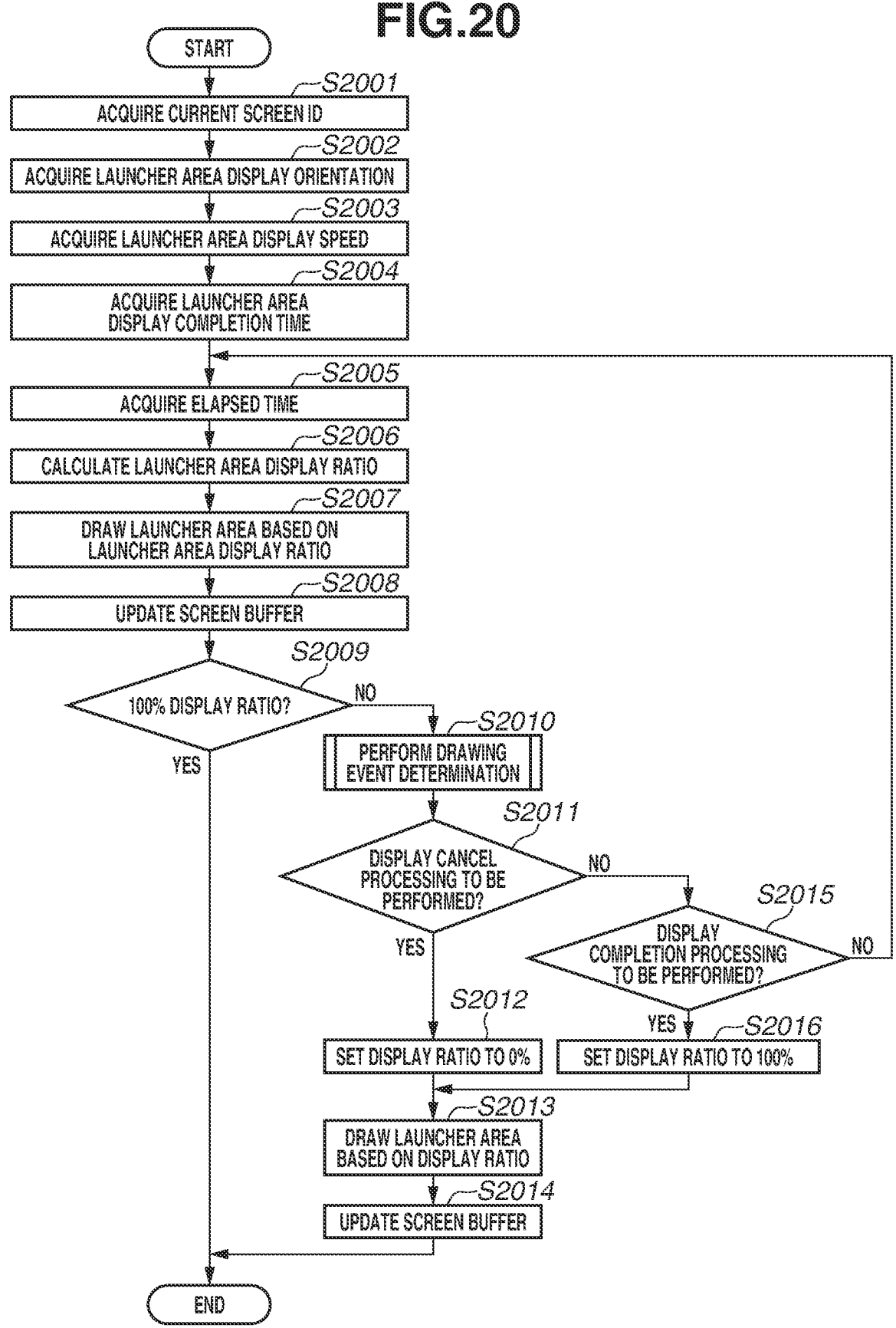
FIG. 20 is a flowchart illustrating an example of drawing processing for the launcher area display according to the exemplary embodiment.

FIG. 20 is a flowchart illustrating drawing processing for the launcher area display. FIG. 20 is a flowchart illustrating details of the processing in step S1608 in FIG. 16. The CPU 101 draws the launcher area according to this flowchart. Each piece of processing illustrated in FIG. 20 is implemented when the CPU 101 loads a program stored in the ROM 102 and executes the program.

In step S2001, the CPU 101 acquires the screen ID of the screen currently displayed on the operation unit 104. Then, the processing proceeds to step S2002.

In step S2002, the CPU 101 acquires the launcher display orientation from the display permission screen table 800 by using the screen ID acquired in step S2001. Then, the processing proceeds to step S2003.

In step S2003, the CPU 101 acquires the launcher area display speed Ls. Then, the processing proceeds to step S2004.

In step S2004, the CPU 101 acquires the launcher area display completion time Et from the display speed table 1200 for the launcher area by using the launcher area display speed Ls acquired in step S2003. Then, the processing proceeds to step S2005.

In step S2005, the CPU 101 acquires the elapsed time from the expiration of the launcher area display timer. Then, the processing proceeds to step S2006.

In step S2006, the CPU 101 assigns the elapsed time acquired in step S2005 and the launcher area display completion time Et acquired in step S2004 to the display ratio calculation formula 1300 for the launcher area to calculate the launcher area display ratio. Then, the processing proceeds to step S2007.

In step S2007, the CPU 101 draws the launcher area based on the launcher area display ratio acquired in step S2006. Then, the processing proceeds to step S2008.

In step S2008, the CPU 101 updates the buffer for the screen displayed on the operation unit 104 to display the launcher area drawn in step S2007. Then, the processing proceeds to step S2009.

In step S2009, the CPU 101 determines whether the launcher area display ratio calculated in step S2006 is 100%. When the CPU 101 determines that the drawn launcher area display ratio is 100% (YES in step S2009), the processing in this flowchart is ended. On the other hand, when the CPU 101 determines that the drawn launcher areas display ratio is not 100% (NO in step S2009), the processing proceeds to step S2010.

In step S2010, the CPU 101 performs the drawing event determination for the screen buffer. Then, the processing proceeds to step S2011. The drawing event determination will be described in detail below with reference to another flowchart.

In step S2011, the CPU 101 determines whether a display cancel processing instruction is issued based on the drawing event determination performed in step S2010. When the CPU 101 determines that a display cancel processing instruction is issued (YES in step S2011), the processing proceeds to step S2012. On the other hand, when the CPU 101 determines that a display cancel processing instruction is not issued (NO in step S2011), the processing proceeds to step S2015.

In step S2012, the CPU 101 sets the launcher area display ratio to 0%. Then, the processing proceeds to step S2013.

In step S2013, the CPU 101 draws the launcher area based on the set display ratio. Then, the processing proceeds to step S2014. When the launcher area display ratio is set to 0% in step S2012, the CPU 101 does not display the launcher area in step S2013.

In step S2014, the CPU 101 updates the buffer for the screen displayed on the operation unit 104 to display the launcher area based on the amount drawn in step S2013. Then, the processing in this flowchart is ended.

In step S2015, the CPU 101 determines whether a display completion processing instruction is issued through the drawing event determination performed in step S2010. When the CPU 101 determines that a display completion processing instruction is issued (YES in step S2015), the processing proceeds to step S2016. On the other hand, when the CPU 101 does not determine that a display completion processing instruction is issued (NO in step S2015), the processing returns to step S2005.

In step S2016, the CPU 101 sets the launcher area display ratio to 100%. Then, the processing proceeds to step S2013.

The drawing event determination processing in step S2010 in FIG. 20 will be described in detail below with reference to FIG. 21.

Figure 21:
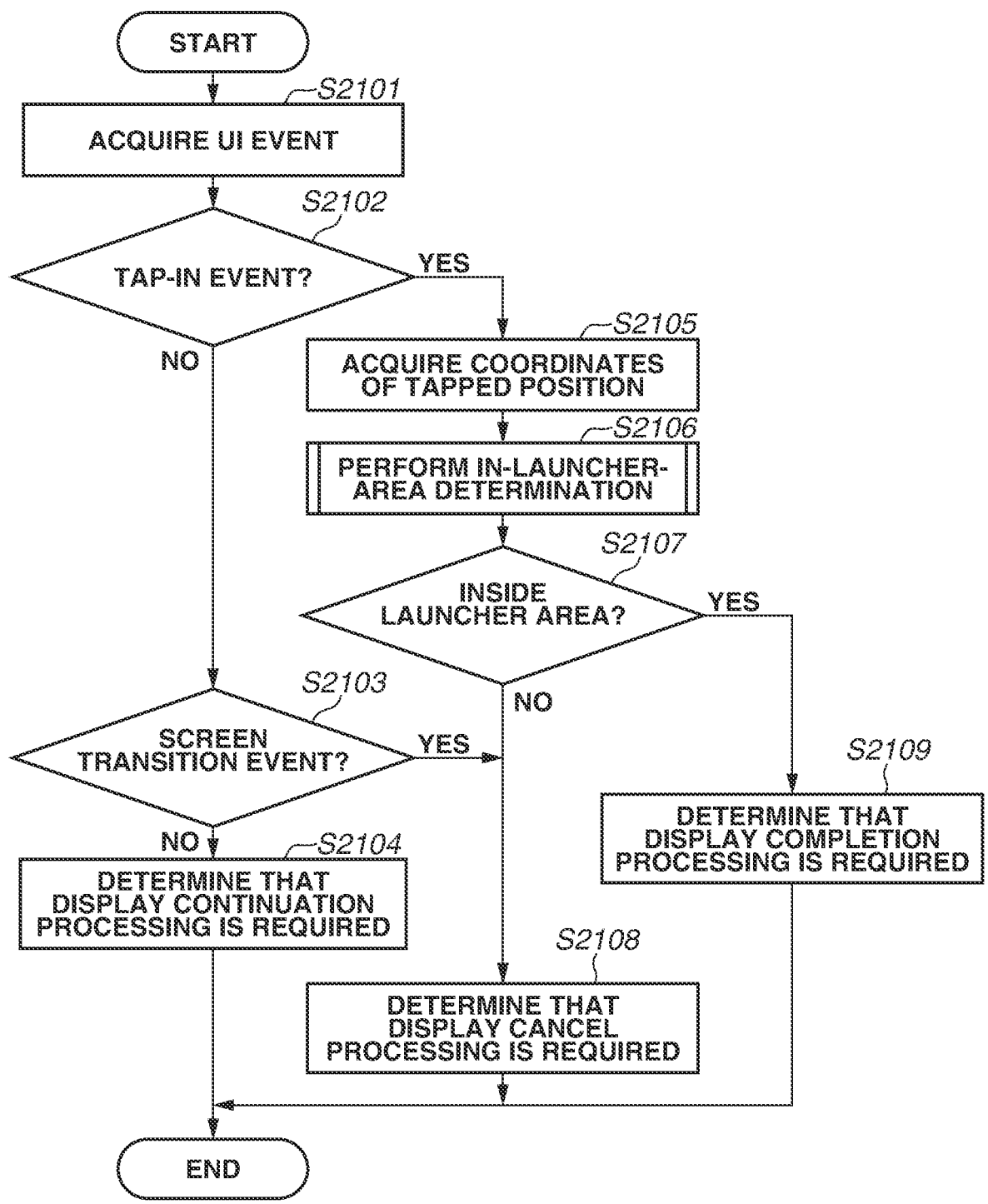
FIG. 21 is a flowchart illustrating an example of processing of drawing event determination for the launcher area display according to the exemplary embodiment.

FIG. 21 is a flowchart illustrating the drawing event determination for the launcher area display. Each piece of processing in this flowchart is implemented when the CPU 101 loads a program stored in the ROM 102 and executes the program.

The CPU 101 determines whether the launcher area drawing processing is to be continued, canceled, or completed according to this flowchart.

In step S2101, the CPU 101 acquires the user interface (UI) event input to the operation unit 104. Then, the processing proceeds to step S2102.

In step S2102, the CPU 101 checks whether the UI event acquired in step S2101 is a tap event. When the UI event is a tap event (YES in step S2102), the processing proceeds to step S2105. On the other hand, when the UI even is not a tap-in event (NO in step S2102), the processing proceeds to step S2103. A tap event refers to an event that is issued when the user touches the touch panel of the operation unit 104 and then performs an operation to select an icon. The tap event is issued when the time period from the start of the touch to the end of the touch is shorter than a predetermined time period, and the difference between the coordinates of the touch start position and the touch end position is smaller than a predetermined value.

In step S2103, the CPU 101 checks whether the UI event acquired in step S2101 is a screen transition event. When the UI event is a screen transition event (YES in step S2103), the processing proceeds to step S2108.

On the other hand, when the UI even is not a screen transition event (NO in step S2103), the processing proceeds to step S2104. A screen transition event refers to an event that is issued when the user touches the operation unit 104 and then moves the touch position over a distance longer than a predetermined value, such as a flick operation, a swipe operation, and a drag operation. The screen transition event is issued when a screen transition is made from the current screen to a screen at a different level or a screen having a different screen ID.

In step S2104, the CPU 101 determines that the screen drawing continuation processing is to be performed, and stores a flag indicating that the screen drawing processing is to be continued in the DRAM 103. Then, the processing in this flowchart is ended.

In step S2105, the CPU 101 acquires the coordinates of the tapped position. Then, the processing proceeds to step S2106.

In step S2106, the CPU 101 performs the in-launcher-area determination processing to determine whether the coordinates acquired in step S2105 are inside the launcher area. Then, the processing proceeds to step S2017. The in-launcher-area determination will be described in detail below with reference to another flowchart.

In step S2107, the CPU 101 determines whether the coordinates are inside the launcher area based on the result of the in-launcher-area determination performed in step S2106. When the tap operation is not performed inside the launcher area (NO in step S2107), the processing proceeds to step S2108. This determination processing is intended to determine, when the user taps a position outside the launcher area during the display of the launcher area, whether to cancel the launcher area display and then display the screen displayed before the launcher area display, on the operation unit 104. On the other hand, when the tap operation is performed inside the launcher area (YES in step S2107), the processing proceeds to step S2109. This processing is intended to, when the user taps a position inside the launcher area during the launcher area display, immediately display the 100% launcher area instead of gradually expanding the launcher area.

In step S2108, the CPU 101 determines that the screen drawing cancel processing is to be performed, and stores a flag indicating that the screen drawing processing is to be canceled in the DRAM 103. Then, the processing in this flowchart is ended.

In step S2109, the CPU 101 determines that the screen drawing completion processing is to be performed, and stores a flag indicating that the screen drawing completion processing is to be performed in the DRAM 103. Then, the processing in this flowchart is ended.

Figure 22:
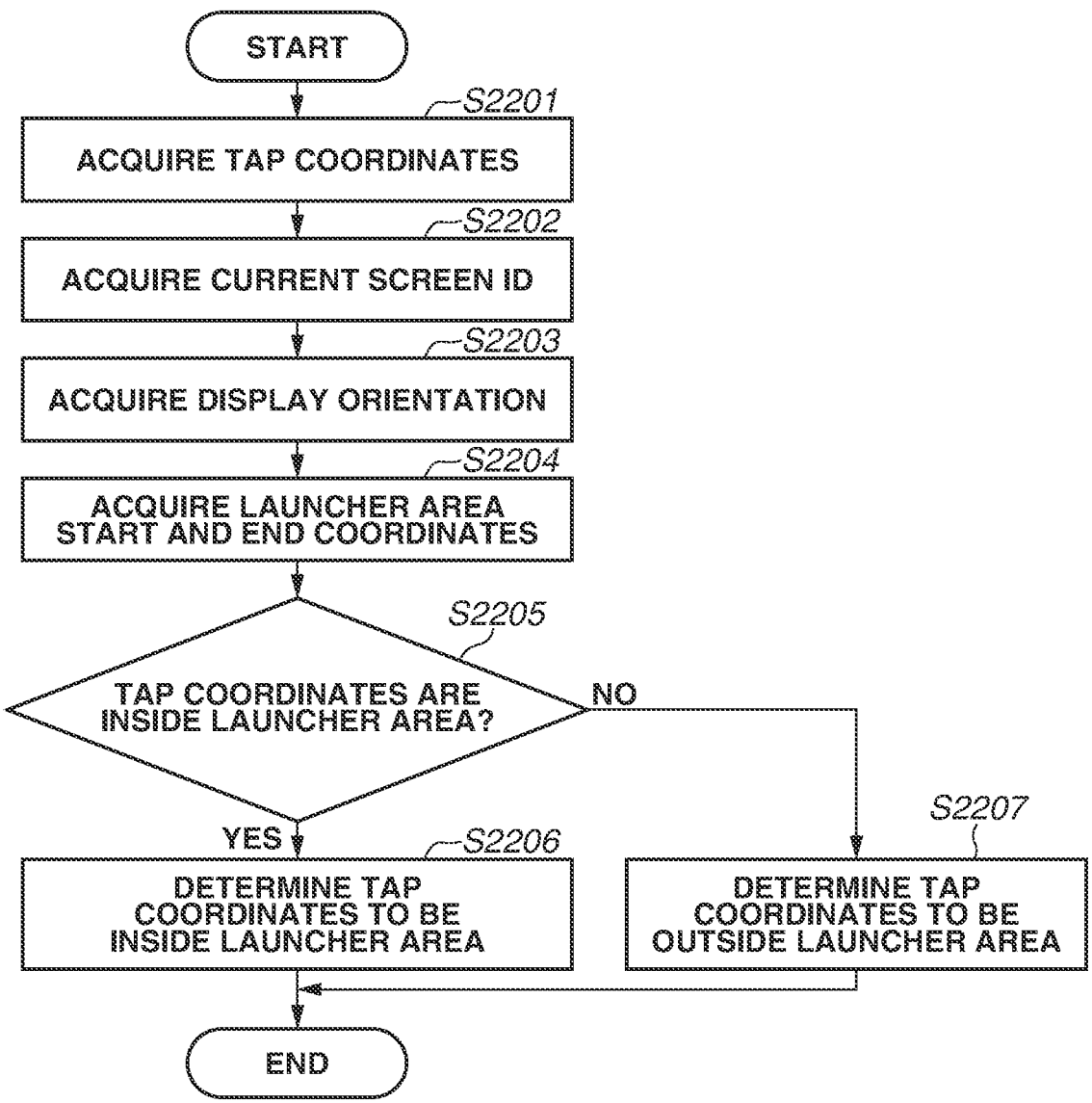
FIG. 22 is a flowchart illustrating an example of processing of in-launcher-area determination for the launcher area display according to the exemplary embodiment.

FIG. 22 is a flowchart illustrating the in-launcher-area determination for the launcher area display. FIG. 22 is a flowchart illustrating details of the processing in step S2106 in FIG. 21. The CPU 101 determines whether the coordinates of the position tapped by the user are inside the launcher area.

Processing in each step of the flowchart in FIG. 22 is implemented when the CPU 101 executes processing stored in the ROM 102.

In step S2201, the CPU 101 acquires the coordinates of the position on the operation unit 104 tapped by the user. Then, the processing proceeds to step S2202. The coordinates acquired in step S2201 may be the coordinates of the touch start position or the coordinates of the touch end position of the tap operation. Further, the coordinates acquired in step S2201 may be the coordinates acquired by using both the touch start position and the touch end position. Examples of coordinates acquired by using both the touch start position and the touch end position include intermediate coordinates between the touch start position and the touch end position.

In step S2202, the CPU 101 acquires the screen ID of the screen currently displayed on the operation unit 104. Then, the processing proceeds to step S2203.

In step S2203, the CPU 101 acquires the launcher area display orientation from the display permission screen table 800 by using the screen ID acquired in step S2202. Then, the processing proceeds to step S2204.

In step S2204, the CPU 101 acquires the launcher area start coordinates Ls and the launcher area end coordinates Le from the launcher area size table 1400 by using the launcher area display orientation acquired in step S2203. Then, the processing proceeds to step S2205.

In step S2205, the CPU 101 checks whether the tap coordinates acquired in step S2201 are inside the launcher area start coordinates Ls and the launcher area end coordinates Le acquired in step S2204.

When the coordinates acquired in step S2201 are inside the launcher area (YES in step S2205), the processing proceeds to step S2206. A case where the coordinates acquired in step S2201 are inside the launcher area is a case where the user selects an icon inside the launcher area. On the other hand, when the coordinates acquired in step S2201 are not inside the launcher area (NO in step S2205), the processing proceeds to step S2207. A case where the coordinates acquired in step S2201 are not inside the launcher area refers to a case where the user operates the screen that has been displayed before the launcher area display.

In step S2206, the CPU 101 determines that the tap coordinates are inside the launcher area, and stores a flag indicating that the tap coordinates are inside the launcher area in the DRAM 103. Then, the processing in this flowchart is ended.

In step S2207, the CPU 101 determines the tap coordinates are outside the launcher area, and stores a flag indicating that the tap coordinates are outside the launcher area in the DRAM 103. Then, the processing in this flowchart is ended.

FIGS. 16 to 21 illustrate the processing for displaying the launcher area as described above.

Figure 23:
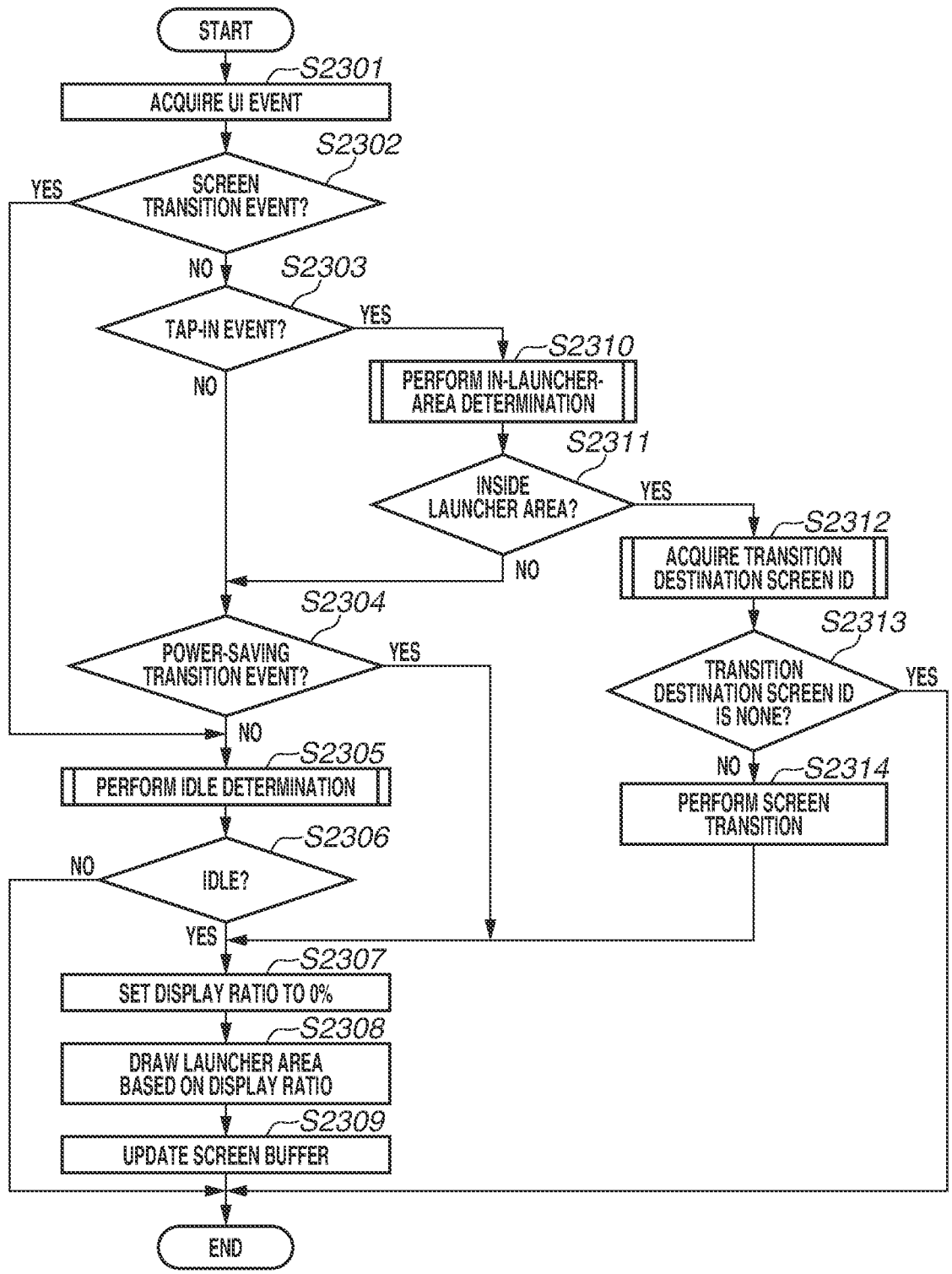
FIG. 23 is a flowchart illustrating an example of processing of non-display control for the launcher area display according to the exemplary embodiment.

FIG. 23 is a flowchart illustrating processing to be performed when a user operation is accepted after completion of the launcher area display, like the screen 902 in FIG. 9 and the screen 1002 in FIG. 10.

This flowchart is repetitively performed after completion of the processing described with reference to FIG. 16. Processing in each step of the flowchart in FIG. 23 is implemented when the CPU 101 loads a program stored in the ROM 102 and executes the program.

In step S2301, the CPU 101 acquires the UI event input to the operation unit 104. Then, the processing proceeds to step S2302.

In step S2302, the CPU 101 checks whether the UI event acquired in step S2301 is a screen transition event. When the UI event is a screen transition event (YES in step S2302), the processing proceeds to step S2305. On the other hand, when the UI event is not a screen transition event (NO in step S2302), the processing proceeds to step S2303.

In step S2303, the CPU 101 checks whether the UI event acquired in step S2301 is a tap-in event. When the UI event is a tap-in event (YES in step S2303), the processing proceeds to step S2310.

On the other hand, when the UI event is not a tap-in event (NO in step S2303), the processing proceeds to step S2304.

In step S2304, the CPU 101 checks whether the UI event acquired in step S2301 is a power-saving transition event. When the UI event is a power-saving transition event (YES in step S2304), the processing proceeds to step S2307. On the other hand, when the UI event is not a power-saving transition event (NO in step S2304), the processing proceeds to step S2305. A power-saving transition event refers to an event that is issued to stop the power supply to predetermined portions of the multifunction peripheral 100 and shift the apparatus to the power-saving state. The predetermined portions include the scanner 105, the printer 106, and the image processing unit 108. The power-saving transition event refers to an event that is issued upon selection of a key displayed on the operation unit 104 for causing the apparatus to enter the power-saving mode.

In step S2305, the CPU 101 performs the idle determination processing to determine whether the multifunction peripheral 100 is in the idle state where no function is executed. Then, the processing proceeds to step S2306.

In step S2306, the CPU 101 checks the result of the idle determination performed in step S2305. When the CPU 101 determines that the multifunction peripheral 100 is not in the idle state (NO in step S2306), the processing proceeds to step S2307. On the other hand, when the CPU 101 determines that the multifunction peripheral 100 is in the idle state (YES in step S2306), the launcher area non-display processing is not to be performed. Then, the processing in this flowchart is ended.

In step S2307, the CPU 101 sets the launcher display ratio to 0%. Then, the processing proceeds to step S2308.

In step S2308, the CPU 101 draws the launcher area based on the launcher area display ratio set in step S2307. Then, the processing proceeds to step S2309.

In step S2309, the CPU 101 updates the buffer for the screen displayed on the operation unit 104 and then displays the launcher area based on the amount drawn in step S2308. Then, the processing in this flowchart is ended.

In step S2310, the CPU 101 performs the in-launcher-area determination to determine whether the coordinates of the position tapped by the user are inside the launcher area. Then, the processing proceeds to step S2311. The CPU 101 determines whether the position selected by the user with a tap operation is inside the launcher area, by using the method described above with reference to FIG. 22.

In step S2311, the CPU 101 determines whether the tap operation is performed inside the launcher area based on the result of the in-launcher-area determination in step S2310. When the CPU 101 determines that the tap operation is performed inside the launcher area (YES in step S2311), the processing proceeds to step S2312. In step S2312, the CPU 101 performs the processing corresponding to the tapped icon inside the launcher area. When the CPU 101 determines that the tap operation is performed outside the launcher area (NO in step S2311), the processing proceeds to step S2304 to end the launcher area display.

In step S2312, the CPU 101 performs the transition destination screen ID acquisition processing for a screen to be displayed on the operation unit 104. Then, the processing proceeds to step S2313. The transition destination screen ID acquisition processing will be described in detail below with reference to another flowchart.

In step S2313, the CPU 101 determines whether the transition destination screen ID acquired in step S2312 is "none". When the transition destination screen ID is "none" (YES in step S2313), neither the screen transition nor the launcher area non-display processing is to be performed. Then, the processing in this flowchart is ended. On the other hand, when the transition destination screen ID is not "none" (NO in step S2313), the screen transition is to be performed. Then, the processing proceeds to step S2314.

In step S2314, the CPU 101 displays a screen corresponding to the transition destination screen ID acquired in step S2312 on the operation unit 104. Then, the processing proceeds to step S2307.

Figure 24:
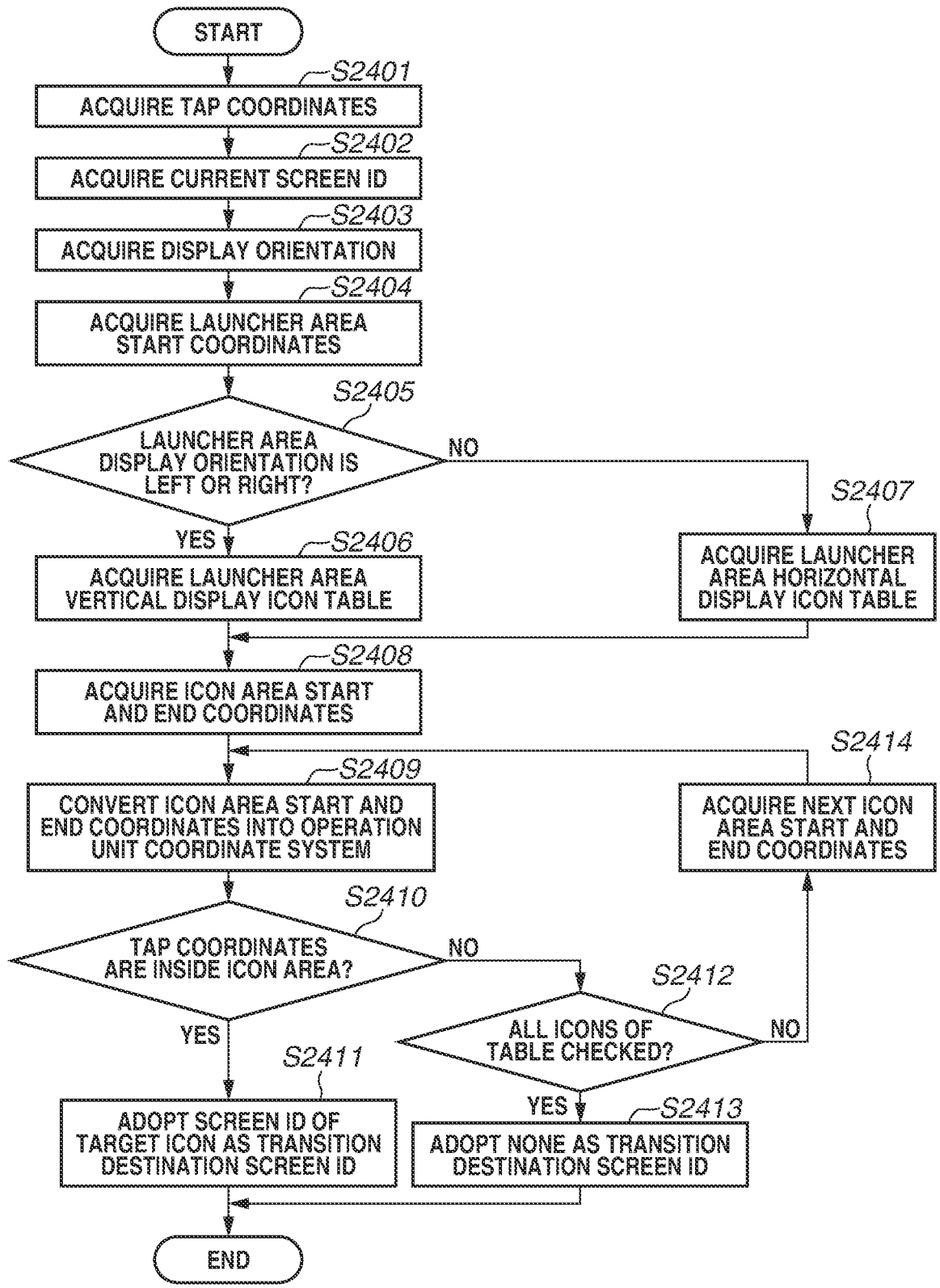
FIG. 24 is a flowchart illustrating an example of processing of transition destination screen identifier (ID) acquisition control for the launcher area display according to the exemplary embodiment.

FIG. 24 is a flowchart illustrating the transition destination screen ID acquisition control for the launcher area display. FIG. 24 is a flowchart illustrating details of the processing in step S2312 in FIG. 23. This flowchart enables acquisition of the transition destination screen ID according to the coordinates of the tap performed by the user.

The flowchart illustrated in FIG. 24 is implemented when the CPU 101 loads a program stored in the ROM 102 and executes the program.

In step S2401, the CPU 101 acquires the coordinates of the position on the operation unit 104 tapped by the user. Then, the processing proceeds to step S2402. Further, the coordinates acquired in step S2401 may be the coordinates of the touch start position and the coordinates of the touch end position of the tap operation. Further, the coordinates acquired in step S2401 may be the coordinates that can be acquired by using both the touch start position and the touch end position. Examples of coordinates that can be acquired by using both the touch start position and the touch end position include intermediate coordinates between the touch start position and the touch end position.

In step S2402, the CPU 101 acquires the screen ID of the screen currently displayed on the operation unit 104. Then, the processing proceeds to step S2403.

In step S2403, the CPU 101 acquires the launcher area display orientation from the display permission screen table 800 by using the screen ID acquired in step S2402. Then, the processing proceeds to step S2404.

In step S2404, the CPU 101 acquires the launcher area start coordinates Ls from the launcher area size table 1400 by using the launcher area display orientation acquired in step S2403. Then, the processing proceeds to step S2405.

In step S2405, the CPU 101 checks whether the launcher area display orientation acquired in step S2403 is the left direction or the right direction. When the launcher area display orientation is the left direction or the right direction (YES in step S2405), the processing proceeds to step S2406. On the other hand, when the launcher area display orientation is neither the left direction nor the right direction (NO in step S2405), the processing proceeds to step S2407.

In step S2406, the CPU 101 acquires the launcher area vertical display icon table 1500 as an icon table. Then, the processing proceeds to step 2408.

In step S2407, the CPU 101 acquires the launcher area horizontal display icon table 1504 as an icon table. Then, the processing proceeds to step 2408.

In step S2408, the CPU 101 acquires the icon area start coordinates and the icon area end coordinates of the starting element of the icon table acquired in step S2406 or S2407. Then, the processing proceeds to step S2409.

In step S2409, the CPU 101 adds the launcher area start coordinates Ls acquired in step S2404 to the icon area start coordinates and the icon area end coordinates acquired in step S2408, and then converts the icon area start coordinates and the icon area end coordinates into the operation unit coordinate system. Then, the processing proceeds to step S2410.

In step S2410, the CPU 101 compares the icon area start coordinates and the icon area end coordinates converted into the operation unit coordinate system in step S2409 with the tap coordinates acquired in step S2401, to check whether the tap coordinates are inside the icon area start and end coordinates converted into the operation unit coordinate system. When the tap coordinates are inside the icon area (YES in step S2410), the processing proceeds to step S2411. On the other hand, when the tap coordinates are outside the icon area (NO in step S2410), the processing proceeds to step S2412.

In step S2411, the CPU 101 adopts the screen ID of the icon table element currently being referenced, as the transition destination screen ID. Then, the processing in this flowchart is ended.

In step S2412, the CPU 101 checks whether the icon table element currently being referenced is the last element of the icon table. When the referenced element is the last element of the icon table (YES in step S2412), the processing proceeds to step S2413. On the other hand, when the referenced element is not the last element of the icon table (NO in step S2412), the processing proceeds to step S2414.

In step S2413, the CPU 101 adopts "none" indicating that the screen transition is not to be performed, as the transition destination screen ID. Then, the processing in this flowchart is ended. This processing is equivalent to the processing performed when a tap operation is performed on a non-icon portion in the launcher area.

In step S2414, the CPU 101 acquires a table element next to the icon table element currently being referenced and acquires the icon area start and end coordinates of the element. Then, the processing proceeds to step S2409.

The present exemplary embodiment makes it possible to, even while a screen different from a screen in which an icon or a shortcut key for activating an application is arranged is displayed, display the icon or the shortcut key without increasing the number of user operations.

Other Exemplary Embodiments

The present exemplary embodiment is merely an example, and embodiments of the present disclosure may be embodied in different forms.

For example, the present exemplary embodiment is described based on a configuration in which, to display a launcher area, a launcher area display ratio is calculated and then the launcher area is drawn in a manner superimposed on the screen currently displayed on the operation unit 104. However, control may be performed to draw the launcher area outside the display area of the operation unit 104 in the screen buffer in advance without calculating the display ratio, and then change the address of the screen buffer to be displayed on the operation unit 104. This enables the launcher area to appear from the outside of the display area of the operation unit 104 as with the present exemplary embodiment.

The present exemplary embodiment is also described based on a configuration in which the launcher area is drawn to be superimposed on the screen buffer by changing the display ratio. However, drawing control may be performed to draw the launcher area by changing a launcher area transparency ratio instead of changing the display ratio.

In addition, in the present exemplary embodiment, a description is given in which an exponential function, linear function, or quadratic function may be used as a formula for calculating the display ratio. However, the 100% launcher area display may be immediately performed upon expiration of the timer instead of calculating the display ratio by using a function.

Furthermore, the present exemplary embodiment is described based on a configuration in which a launcher area size is stored in the launcher area size table 1400 and the launcher area is drawn based on the size. However, the launcher area size may be variable for each screen or may be changed to an arbitrary size desired by the user by operating the launcher area displayed on the operation unit 104.

The present exemplary embodiment is described based on a configuration in which a launcher area display orientation is stored in the display permission screen table 800 and the launcher area is displayed from the orientation. However, the user may make a change to display the launcher area from an arbitrary orientation desired by the user by operating the launcher area displayed on the operation unit 104.

Finally, in the present exemplary embodiment, the initial value of the launcher area display ratio is set to 0%. However, the user may arbitrarily change the value to another value other than 0%.

Embodiments of the present disclosure are implemented by performing the following processing. More specifically, software (program) for implementing the functions of the above-described exemplary embodiment is supplied to a system or apparatus via a network or various types of storage media, and a computer (or CPU or micro processing unit (MPU)) of the system or apparatus reads and executes the program. In this case, the computer program and the storage medium storing the program are included in embodiments of the present disclosure.

According to embodiments of the present disclosure, it is possible to, even while a screen different from a screen in which an icon or a shortcut key for activating an application is arranged is displayed, display the icon or the shortcut key without increasing the number of user operations.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-012779, filed Jan. 29, 2021, which is hereby incorporated by reference herein in its entirety.

What is claimed is:

1. An image forming apparatus having a first function and a second function, the image forming apparatus comprising:
   a display unit configured to display a screen; and
   a controller including a processor, the controller being configured to:
      cause the display unit to display a first setting screen of the first function;
      cause the display unit to display a second setting screen of the first function in accordance with a user operation received via the displayed first setting screen;
      cause the display unit to display a shortcut object for accepting another user operation for displaying a third setting screen of the second function with the displayed first setting screen in a case where no user operation has been received via the displayed first setting screen for a predetermined time, wherein the shortcut object is not displayed with the second setting screen; and
      cause the display unit to display the third setting screen upon selection of the shortcut object.

2. The image forming apparatus according to claim 1, wherein, based on identification information about a screen currently displayed on the display unit, the controller controls a position where the shortcut object is to be displayed.

3. The image forming apparatus according to claim 1,
   wherein the first setting screen is a screen at a predetermined level related to the first function, and the shortcut object is not displayed in the second setting screen at a level different from the predetermined level,
   wherein the controller is further configured to determine whether to display the shortcut object together with a screen based on the level of the screen to be displayed on the display unit, and
   wherein, in a case where the controller determines that the shortcut object is displayed together with the screen, the shortcut object is displayed together with the screen.

4. The image forming apparatus according to claim 1, wherein the shortcut object is removed upon a user operation of an area where the first setting screen is displayed in a state where at least one of the shortcut object and the first setting screen is displayed on the display unit.

5. The image forming apparatus according to claim 1, wherein the controller accepts a user operation for setting a predetermined time period from when display of at least a part of the shortcut object is started to when display of the entire shortcut object is completed.

6. The image forming apparatus according to claim 5, wherein the controller does not display the shortcut object in a case where the screen to be displayed on the display unit is changed before the predetermined time period elapses in a state where no user operation is accepted.

7. The image forming apparatus according to claim 1, wherein the first function is a copy function for printing an image based on the image data.

8. The image forming apparatus according to claim 7, wherein the second function is a transmission function for transmitting the image data to another apparatuses.

9. The image forming apparatus according to claim 7, wherein the first setting screen includes a start key for starting to read an original.

10. The image forming apparatus according to claim 9, wherein the second setting screen does not include the start key.

11. The image forming apparatus according to claim 9, wherein the shortcut object is displayed at a position different from another position at which the start key is displayed.

12. The image forming apparatus according to claim 1, wherein the controller does not cause the display unit to display the shortcut object in a case that the second setting screen is displayed on the display unit.

13. A method for controlling an image forming apparatus having a first function and a second function, the method comprising:
   causing a display unit to display a first setting screen of the first function;
   causing the display unit to display a second setting screen of the first function in accordance with a user operation received via the displayed first setting screen;
   causing the display unit to display a shortcut object for accepting another user operation for displaying a third setting screen of the second function with the displayed first setting screen in a case where no user operation has been received via the displayed first setting screen for a predetermined time, wherein the shortcut object is not displayed with the second setting screen; and
   causing the display unit to display the third setting screen upon selection of the shortcut object.

* * * * *